United States Patent
Dixon et al.

(10) Patent No.: US 11,042,864 B1
(45) Date of Patent: *Jun. 22, 2021

(54) PROACTIVE BANK TRANSACTION STAGING METHODS AND SYSTEMS

(71) Applicant: United Services Automobile Association (USAA), San Antonio, TX (US)

(72) Inventors: David Patrick Dixon, Boerne, TX (US); John Hope, San Antonio, TX (US); John Loflin, San Antonio, TX (US); Ogechi Namme, San Antonio, TX (US); Andre Rene Buentello, San Antonio, TX (US); Bradly Jay Billman, San Antonio, TX (US); Sharon Kay Haverlah, Bulverde, TX (US); Ross Andrew Thiele, Boerne, TX (US); Gunjan Vijayvergia, San Antonio, TX (US); Michael Joseph Gaeta, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 16/455,083

(22) Filed: Jun. 27, 2019

Related U.S. Application Data

(63) Continuation of application No. 14/201,736, filed on Mar. 7, 2014, now Pat. No. 10,373,148, and a
(Continued)

(51) Int. Cl.
*G06Q 20/40* (2012.01)
*G06Q 20/22* (2012.01)
*G06Q 20/32* (2012.01)

(52) U.S. Cl.
CPC ......... *G06Q 20/22* (2013.01); *G06Q 20/3224* (2013.01)

(58) Field of Classification Search
CPC ... G06Q 20/40; G06Q 20/405; G06Q 20/4016
(Continued)

(56) References Cited

U.S. PATENT DOCUMENTS 6,842,719 B1  1/2005  Fitzpatrick
7,606,560 B2  10/2009  Labrou et al.
(Continued)

FOREIGN PATENT DOCUMENTS

KR  1020100027675 A  3/2010

OTHER PUBLICATIONS

U.S. Appl. No. 14/201,736, filed Mar. 7, 2014, Proactive Bank Transaction Staging Methods and Systems.
(Continued)

*Primary Examiner* — Hai Tran
(74) *Attorney, Agent, or Firm* — Perkins Coie LLP

(57) ABSTRACT

Various embodiments of the present disclosure generally relate transacting in advance. More specifically, various embodiments relate to detecting a mobile computing device of a user within a proximity of a banking location; receiving, via the mobile application, an indication of a type of transaction to be conducted; and directing, via the mobile application, the user to an area of the banking location based on the type of transaction to complete the transaction.

20 Claims, 26 Drawing Sheets

Related U.S. Application Data continuation-in-part of application No. 13/673,663, filed on Nov. 9, 2012, now Pat. No. 10,387,876, and a continuation-in-part of application No. 13/673,040, filed on Nov. 9, 2012, now abandoned.

(60) Provisional application No. 61/881,920, filed on Sep. 24, 2013, provisional application No. 61/557,636, filed on Nov. 9, 2011.

(58) Field of Classification Search
USPC .......................................................... 705/44
See application file for complete search history.

(56) References Cited

U.S. PATENT DOCUMENTS

| | | |
|---|---|---|
| 7,712,657 B1 | 5/2010 | Block et al. |
| 7,798,397 B2 | 9/2010 | Henry et al. |
| 7,878,393 B2 | 1/2011 | Henry et al. |
| 8,091,778 B1 | 1/2012 | Block et al. |
| 8,220,707 B1 | 7/2012 | Block et al. |
| 8,225,992 B2 | 7/2012 | Henry et al. |
| 8,387,868 B2 | 3/2013 | Henry et al. |
| 10,373,148 B1 | 8/2019 | Dixon et al. |
| 10,387,876 B1 | 8/2019 | Buentello et al. |
| 2005/0289030 A1 | 12/2005 | Smith |
| 2007/0282742 A1 | 12/2007 | Schrupp et al. |
| 2008/0010163 A1 | 1/2008 | Kish |
| 2008/0040233 A1 | 2/2008 | Wildman |
| 2009/0254479 A1 | 10/2009 | Pharris |
| 2011/0022484 A1 | 1/2011 | Smith et al. |
| 2011/0178910 A1 | 7/2011 | Benefield et al. |
| 2011/0213671 A1 | 9/2011 | Hirson et al. |
| 2011/0246316 A1 | 10/2011 | Cincera |
| 2011/0276478 A1 | 11/2011 | Hirson et al. |
| 2012/0005076 A1 | 1/2012 | Dessert |

OTHER PUBLICATIONS

U.S. Appl. No. 61/881,920, filed Sep. 24, 2013, Proactive Bank Transaction Staging Process for Smart Devices.

U.S. Appl. No. 61/557,636, filed Nov. 9, 2011, Banking in Advance.

U.S. Appl. No. 13/673,040, filed Nov. 9, 2012, Transacting in Advance.

U.S. Appl. No. 13/673,663, filed Nov. 9, 2012, Transacting in Advance.

NCR Corporation, "NCR makes wireless withdrawals in under 10 seconds at the ATM", Jun. 11, 2012, 1 page.

FIG. 11

PROACTIVE BANK TRANSACTION STAGING METHODS AND SYSTEMS

CROSS-REFERENCE TO RELATED APPLICATIONS

This application is a continuation of U.S. patent application Ser. No. 14/201,736, filed Mar. 7, 2014, entitled "PROACTIVE BANK TRANSACTION STAGING METHODS AND SYSTEMS," now allowed; which is a continuation-in-part of pending U.S. patent application Ser. No. 13/673,040, filed Nov. 9, 2012, entitled "TRANSACTING IN ADVANCE," and a continuation-in-part of pending U.S. patent application Ser. No. 13/673,663, filed Nov. 9, 2012, entitled "TRANSACTING IN ADVANCE," both of which claim priority to U.S. Provisional Application No. 61/557,636, filed on Nov. 9, 2011, entitled "BANKING IN ADVANCE," each of which are hereby incorporated by reference in their entireties for all purposes. This application also claims priority to U.S. Provisional Application No. 61/881,920, filed Sep. 24, 2013, entitled "PROACTIVE BANK TRANSACTION STAGING PROCESS FOR SMART DEVICES," which is also incorporated by reference in its entirety for all purposes.

TECHNICAL FIELD

Various embodiments of the present invention generally relate to transactions. More specifically, methods and systems for generating and staging transactions at a point of transaction are disclosed.

BACKGROUND

Accomplishing financial transactions at banking locations such as ATMs, kiosks, and brick-and-mortar banks can sometimes impose significant wait times for customers. Whether a customer is waiting in line at an ATM, at a customer service counter for their transaction to be processed, or behind many cars in a drive-up teller lane at a bank, the time lost waiting can frustrate customers.

Therefore, customers may prefer to accomplish transactions, or at least as much of the transaction as possible, outside of the banking locations and complete the transaction quickly at a scheduled time at a convenient banking location.

SUMMARY

In some embodiments, a mobile computing device of a user is detected within a proximity of a banking location. An indication of a type of transaction to be conducted may be received via a mobile application running on the mobile computing device, and the user may be directed to an area of the banking location based on the type of transaction.

One embodiment provides a method that includes receiving a request for a transaction from a user device of a user, processing the transaction, where processing the transaction includes determining that user interaction at a point of transaction is necessary to complete the transaction; determining possible points of transaction based on a location of the user and a type of the requested transaction; accessing user preference information relating to the possible points of transaction; recommending, to the user, a subset of the possible points of transaction based at least in part on the user preference information relating to the possible points of transaction; and receiving a selection of a point of transaction.

In some embodiments, the user's mobile computing device is detected actively or passively when the user is within a proximity of the banking location. Upon detection, the user may receive a message regarding a pre-staged transaction or inquiring about a new transaction. The user may be directed to an area of a banking location based the pre-staged or new transaction information.

In some embodiments, the transaction is a financial transaction. The point of transaction may be a network location, or it may be a physical location.

The method may further include scheduling the transaction for completion at the point of transaction. In some embodiments, the method includes registering the user device with a customer account, where registering the user device with a customer account includes receiving a request to register the user device with the customer account; collecting identifying information related to the user device; and associating the user device and the identifying information related to the user device with the customer account. The identifying information may be selected from the group including: a phone number, an internet protocol address, and a vehicle. In some embodiments, registering the user device with the customer account occurs prior to receiving the request for the transaction.

The method may further include generating a unique identifier for the transaction comprising information relating to the transaction, where the unique identifier is based on the selected point of transaction, and where the unique identifier is used to complete the transaction.

In some embodiments, the method further includes determining a safety factor related to each of the possible points of transactions, and determining the safety factor includes accessing public records and determining crime rates associated with the possible points of transactions. Recommending, to the user, a subset of the possible points of transaction to complete the transaction may be further based on the determined safety factor related to each of the possible points of transaction.

In some embodiments, the user preferences include a type of the point of transaction and a maximum wait time. In some embodiments, the method further includes accessing information relating to a past behavior, and recommending, to the user, a subset of the possible points of transaction is further based on the past behavior of the user. In some embodiments, the information relating to the past behavior of the user includes previously used points of transaction for similar transactions and previously used points of transaction during a similar time of day.

The method may further include in response to receiving a selection of the point of transaction, generating a route to the selected point of transaction, and presenting the route to the user. Generating the route to the selected point of transaction may include accessing public records relating to crime rates along possible routes to the selected point of transaction, and selecting the route with the lowest crime rate.

Recommending a subset of the possible points of transaction may be further based on fees at each of the possible points of transaction for completing the transaction. In some embodiments, the method further includes scheduling the transaction for completion at the selected point of transaction. In some embodiments, the method further includes detecting a type of channel the request is received through, where recommending, to the user, a subset of the possible points of transaction to complete the transaction is further based on the channel.

One embodiment includes a non-transitory machine-readable medium having machine executable instructions stored thereon that, when executed by one or more processors, direct the one or more processors to perform a method including receiving a request to register a user device of a user with the customer account; collecting identifying information related to the user device; associating the user device and the identifying information related to the user device with the customer account; receiving a request for a financial transaction from the user device; processing the financial transaction, where processing the financial transaction comprises determining that user interaction at a point of transaction is necessary to complete the financial transaction; determining possible points of transaction based on a location of the user and a type of the requested transaction; accessing user preference information relating to the possible points of transaction, where the user preferences includes a type of the point of transaction and a maximum wait time, accessing information relating to a past behavior of the user, where information relating to the past behavior of the user comprises previously used points of transaction for similar transactions and previously used points of transaction during a similar time of day; determining a safety factor related to each of the possible points of transactions, where determining the safety factor includes accessing public records; and determining crime rates associated with the possible points of transactions; recommending, to the user, a subset of the possible points of transaction based at least in part on the user preference information relating to the possible points of transaction, the safety factor related to each of the possible points of transaction, and the past behavior of the user; receiving a selection of a point of transaction; in response to receiving a selection of the point of transaction, generating a route to the selected point of transaction; presenting the route to the user; and scheduling the financial transaction for completion at the point of transaction.

One embodiment includes a system with one or more processors; and computer-readable code that programs the one or more processors to receive a request to register a user device of a user with the customer account; collect identifying information related to the user device; associate the user device and the identifying information related to the user device with the customer account; receive a request for a financial transaction from the user device; process the financial transaction, where processing the financial transaction comprises determining that user interaction at a point of transaction is necessary to complete the financial transaction; determine the possible points of transaction based on a location of the user and a type of the requested transaction; access user preference information relating to the possible points of transaction, where the user preferences comprise a type of the point of transaction and a maximum wait time; access information relating to a past behavior of the user, where information relating to the past behavior of the user comprises previously used points of transaction for similar transactions and previously used points of transaction during a similar time of day; determine a safety factor related to each of the possible points of transactions, where determining the safety factor includes accessing public records; and determining crime rates associated with the possible points of transactions; recommend, to the user, a subset of the possible points of transaction based at least in part on the user preference information relating to the possible points of transaction, the safety factor related to each of the possible points of transaction, and the past behavior of the user; receive a selection of a point of transaction; in response to receiving a selection of the point of transaction, generate a route to the selected point of transaction; and present the route to the user; and schedule the financial transaction for completion at the point of transaction.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 11 illustrates examples of user interfaces.

Figure 1:
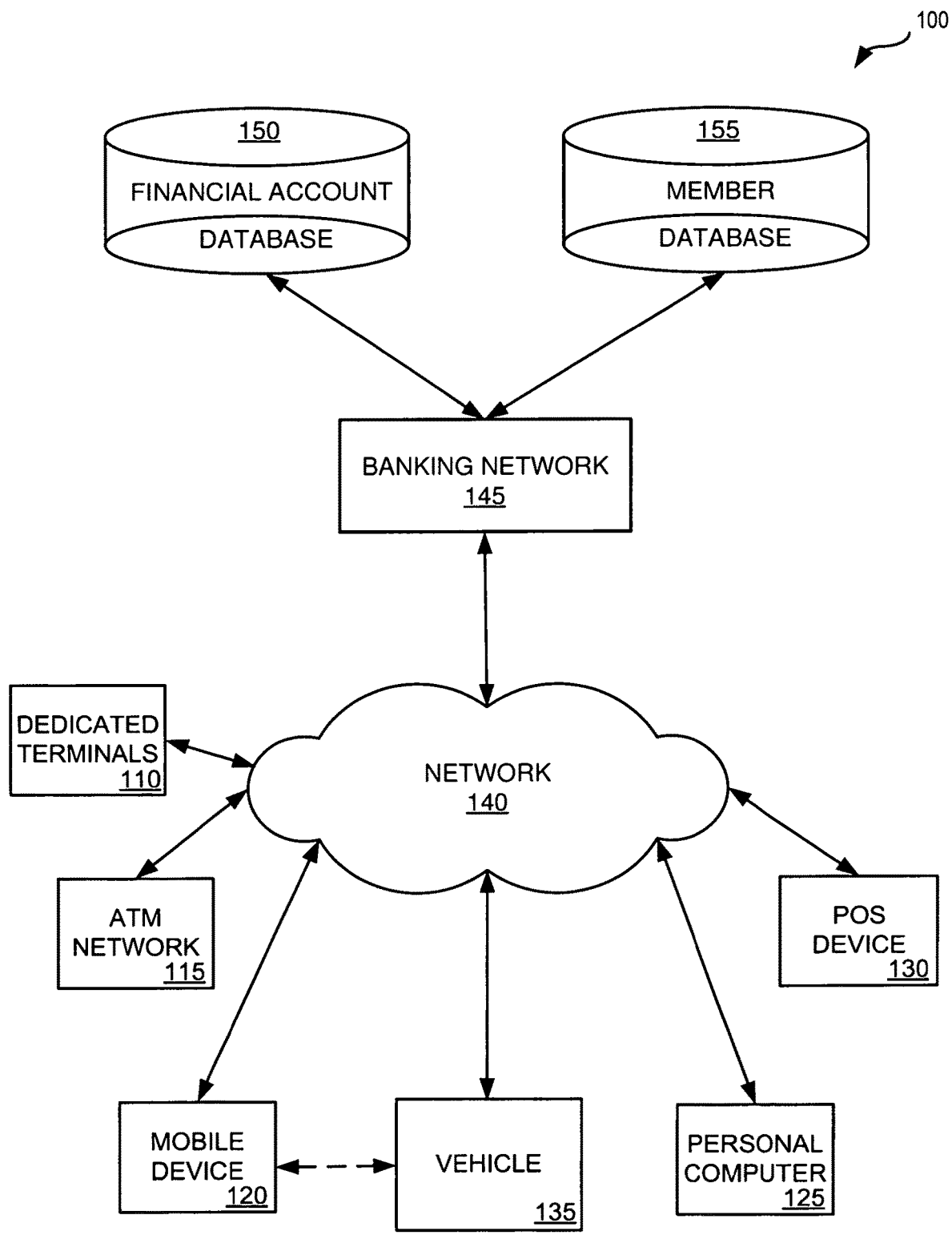
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or operations or combined into a single block or operation for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to transactions. More specifically, methods and systems for generating and staging transactions at a point of transaction are disclosed. In some embodiments, the transaction is a financial transaction. In such embodiments, a customer initiates and completes a portion of a transaction using a registered device, receives recommendations of points of transactions where the transaction can be completed, and schedules a time to complete the transaction (or places the transaction in a queue) at the selected point of transaction. Therefore, at least a portion of the transaction may be completed prior to the time the customer goes to the point of transaction, and wait lines may be avoided by scheduling a completion time of the transaction at the selected point of transaction. Further, customers may prefer to complete a transaction to the extent possible in the privacy of their home or vehicle to minimize the risk of identity theft that has been problematic at ATMs and other banking locations.

In some embodiments, a customer requests a transaction that requires some type of user interaction at a point of transaction to complete the transaction, such as depositing cash, cashing a check, or providing a signed copy of a document. The user may identify where the customer would like to complete the transaction. Sometimes, the customer identifies a general location for completion or the user's mobile device may help determine a location. Points of transaction around the area of the identified completion location are determined. This determination may include an analysis of suitable and preferable points of transaction. These possible points of transaction are displayed for the customer on the user device. The customer may select the particular point of transaction. A unique identifier may be generated for the transaction and sent to the user. The customer may present the unique identifier to the point of transaction, which identifies the transaction and, in some cases, authenticates the customer. The content of the information contained in the unique identifier may depend on the sophistication of the point of transaction and/or a relationship, if any, with the transacting entity or financial institution. Commonly assigned application U.S. patent application Ser. No. 13/425,227 entitled "Dynamic Risk Engine" discusses performing activities on one channel and transferring the activities seamlessly to a different channel during a session, which is hereby incorporated by reference for all purposes in its entirety.

In a specific example, a customer launches a mobile application, is authenticated, selects the type of transaction such as "Deposit at a Retail Location," (or the like) and selects an account to deposit into, along with the amount of the deposit, if known. The customer may simply identify the retail location or other point of transaction where the user wishes to make the deposit, such as a CVS store, a UPS store, etc. The transaction may be scheduled for completion at the selected retail location. A unique identifier may be generated and sent to the customer to provide the point of transaction. The customer may present the unique identifier and make the deposit at the selected point of transaction.

The description discusses financial transactions and "banking locations." However, the references to financial transactions and banking locations are for illustration only; the concepts are equally applicable to other types of transactions and various types of network and physical locations.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. For example, many of the embodiments are discussed with regard to examples involving banking transactions. One of skill in the art will recognize that embodiments of the present invention are equally applicable to other types of transactions in other industries.

FIG. 1 illustrates an example of an operating environment 100 in which some embodiments of the present invention may be utilized. The embodiments of the present invention illustrated in FIG. 1 allow user interactions through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone, smartphone, laptop, tablet computer), personal computers 125, point of sale (POS) devices 130, and vehicle 135. These points of interaction can include mechanisms for generating, submitting and processing transactions through network 140 to banking network 145 and may run one or more applications or clients that allow a user to interact with the banking network 145. Such applications may provide access to various banking processing systems and interfaces that include banking functionality such as withdrawals, balance inquiries, deposits, transfers, etc.

Dedicated terminals 110 such as public terminals/kiosks may be computers available to the public and/or specially designed kiosks that interact with banking network 145. ATM network 115 can be any set of ATMs in an interbank ATM network and/or intrabank ATM network. Mobile device 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, and/or laptops possibly with a wireless connection (such as an 802.11a/b/g connection or mobile broadband connection, such as via a 3G or 4G wireless network). Personal computer 125 may be any computer (e.g., desktop computers, laptop computers, netbooks, tablet computers, Internet-enabled television devices, etc.) connected to network 140. Vehicle 135 may include software and/or hardware providing a system capable of communicating with the points of interaction. Additionally, a mobile device 120 or other device may be communicably coupled with vehicle 135, such as via Bluetooth or other appropriate wireless link, hardwire connected to the vehicle 135, docked in a specially-designed docking station integral to the vehicle 135 as described in U.S. Provisional Application No. 61/481,036 "Dedicated Short-Range Communications (DSRC) to Make Payments from Vehicles Using Vehicle-Based, Cloud-Based or Smartphone-Based Mobile Wallets" and U.S. patent application Ser. No. 13/460,380 entitled "Dedicated Short-Range Communications (DSRC) to Make Payments from Vehicles Using Vehicle-Based, Cloud-Based or Smartphone-Based Mobile Wallets," both of which are hereby incorporated by reference in their entirety.

POS device 130 can be any device used as a checkout or payment receiving mechanism for a merchant or service provider such as a hospital, ambulance company, doctor, automobile repair shop, pharmacy, clothing store, and others. For example, POS device 130 can be a terminal located at a merchant, a computer-based interface such as a webpage or custom application, a telephone payment system, and others.

Banking network 145 may include any number of membership organizations, banks, credit unions, or other financial institutions. In accordance with embodiments of the present disclosure, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, banking network 145 can be communicably coupled to one or more databases such as financial account database 150 and member database 155. These databases can have a variety of information that can be utilized by the transacting in advance systems. For example, financial account database 150 includes account information for members of a financial institution. Member database 155 stores information about members (or customers) of a membership organization (or financial institution). For example, member database 155 may store information associated with member devices such as mobile device 120 or personal computer 125, should the member choose to register the device. Additionally, membership database 155 can include information such as employer, total balance of all accounts held at the membership organization, credit ratings, home ownership information, annual salary, length of membership, purchase history, user-selectable preferences for transactions such as banking, and/or other information. In some embodiments, these two databases can be integrated into one database. A computer system associated with a membership organization, a bank, a credit union, or other financial institution within banking network 145 may be able to access these (and other) databases for account information, customer information, and other stored information.

Figure 2:
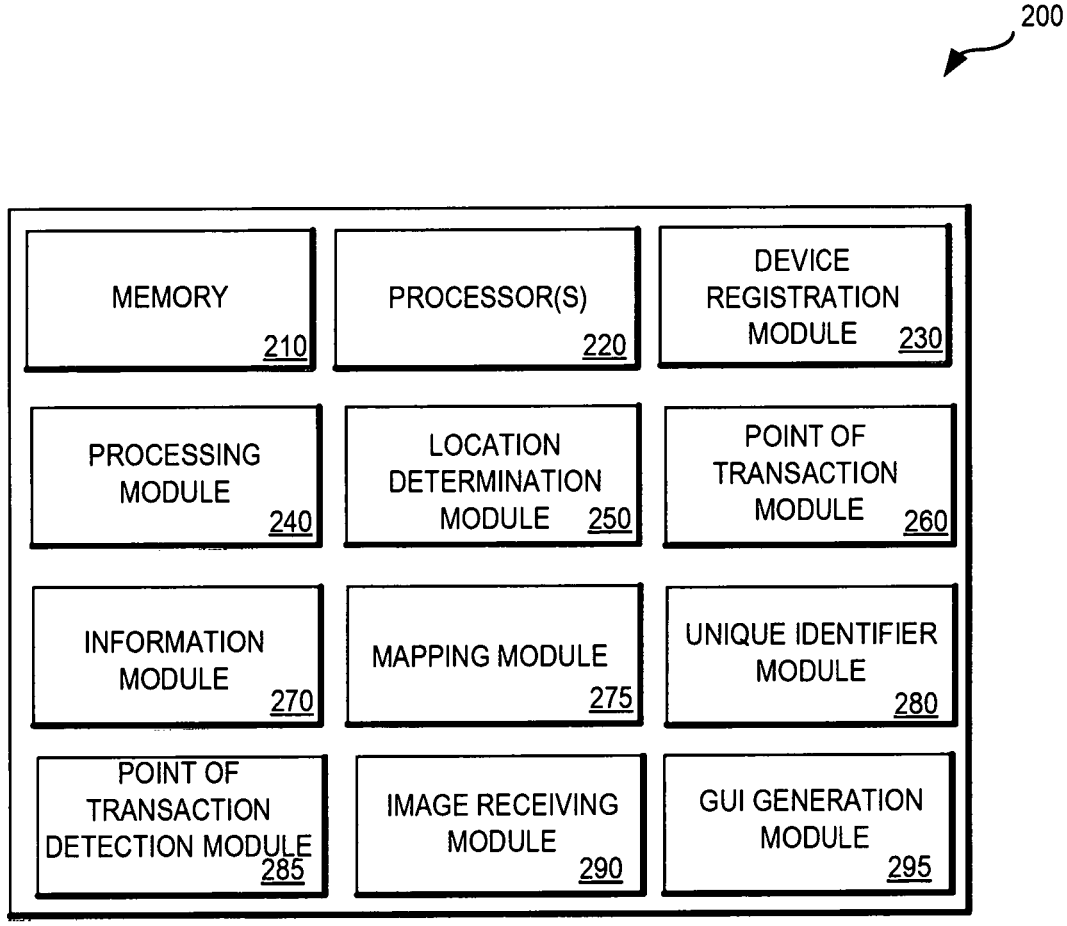
FIG. 2 is a block diagram illustrating components that can be included in a system in accordance with various embodiments of the present invention.

FIG. 2 is a block diagram illustrating components that can be included in a transacting in advance system 200 in accordance with various embodiments of the present invention. Some or all of the components described in FIG. 2 may be used to perform the operations described in FIGS. 3-5 and 22-23. Components in the transacting in advance system 200 may be installed on mobile device 120, personal computer 125, POS device 130, or a computing device at a financial organization for example. According to the embodiments shown in FIG. 2, the transacting in advance system 200 can include memory 210, one or more processors 220, device registration module 230; processing module 240, location determination module 250, point of transaction module 260, information module 270, mapping module 275, unique identifier module 280, point of transaction detection module 285, image receiving module 290, and GUI generation module 295. Other embodiments of the present disclosure may include some, all, or none of these modules and components along with other modules, applications, and/or components. Still yet, some embodiments may incorporate two or more of these modules into a single module and/or associate a portion of the functionality of one or more of these modules with a different module.

Memory 210 can be any device, mechanism, or populated data structure used for storing information. In accordance with some embodiments of the present invention, memory 210 can encompass any type of, but is not limited to, volatile memory, nonvolatile memory, and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, databases, tables, files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of device registration module 230, processing module 240, location determination module 250, point of transaction module 260, information module 270, mapping module 275, unique identifier module 280, point of transaction detection module 285, image receiving module 290, and GUI generation module 295.

Device registration module 230 is configured to register one or more devices with a customer account. Registration may include providing a phone number, if the device is a smartphone, for example. Registering may include a process where the customer downloads an application provided by the transacting organization onto the device, enabling the customer to transact in advance. The customer may choose to register devices associated with family members or friends with the customer's account. Registering other people's devices with the customer's account may assist in completing transactions such as transferring or receiving funds to or from the other person, allowing another person to complete a transaction for the customer, and in other transactions.

The registered devices may include any computing device including, but not limited to a mobile phone, smartphone, tablet computer, laptop computer, desktop computer, communication device associated with a vehicle, and the like. In some embodiments, device registration module 230 is configured to collect identifying information related to the user device. The identifying information may include a device fingerprint, IP address, phone number, etc. The device registration module 230 may be configured to associate the user device with the customer account using the identifying information. The device may be registered with the customer account prior to receiving the request for the transaction or during a transaction.

Processing module 240 is configured to process any transaction that is received. Processing may include withdrawing funds for pending transactions, documenting an insurance claim, etc. Processing module 240 may be configured to determine whether it will be necessary for the customer to go to a point of transaction such as a physical location or a network location to complete the transaction. Processing module 240 may also be configured to receive images from image receiving module 290, process the image, and extract information from the image.

Location determination module 250 is configured to determine a current location of the customer or receive an indication of where the user wishes to complete the transaction. Location determination module 250 may be configured to receive information from the processing module regarding whether a location needs to be determined. Location determination module may use functionality on the customer's mobile device to determine the user's location. Alternatively, the customer may provide a location by keying in a zip code or an address. Sometimes the location for the completion of the transaction may be different than the customer's current location. For example, if the customer wishes to transfer money for pick-up by another, the customer may key in or state the recipient's location. In some embodiments, the customer may provide a recipient's name and allow the location determination module 250 to determine a location associated with the recipient. For example, if the recipient has a registered device or is otherwise associated with the customer's account, the location determination module 250 may use this information to locate the recipient. The location determination module may use address information stored in the customer's mobile device to locate the recipient.

Point of transaction module 260 is configured to determine possible points of transaction in a prescribed radius of the determined location for transaction completion, as supplied by the location determination module 250. For example, the customer's transaction may include the purchase of a gift card. Point of transaction module 260 is configured to determine the points of transactions that are capable of dispensing gift cards. Point of transaction module 260 may be further configured to determine whether the points of transaction are in working order to complete the transaction. For example, point of transaction module 260 may determine that a particular point of transaction in the prescribed radius is out of gift cards. Thus, this point of transaction would not be included in the possible points of transaction. Point of transaction module 260 may additionally be configured to provide the possible points of transaction to information module 270.

Information module 270 is configured to receive the possible points of transaction from point of transaction module 260, gather information, including preference information, historical information, and publicly available information and to provide a recommendation of a subset of the possible points of transaction based on the information. In some embodiments, information module 270 is configured to access account and member information from financial account database 150 and member database 155, which may include customer preference data and past behavioral data.

Customer preferences may include user-selectable preferences or criteria that the customer has provided to the financial institution or other transacting entity prior to the transaction. Such preferences may include the customer's preferred type of point of transaction location (e.g., kiosk, ATM, drive-through, POS device at certain store, network location) for various transactions. Preferences may include a preference of a type of point of transaction or a specific point of transaction depending on the type of transaction being staged, the time the customer is staging the transaction, the specified completion time of the transaction, the device used for staging, and the like. For example, suppose the customer has specified a preference for scheduling transactions at a point of transaction in a grocery store when the transaction is staged from the customer's at-home computer. If a request is received from the customer's at-home computer, then the point of transaction at a grocery store may be automatically selected, or at least included in the list of recommended possible points of transactions.

Devices, such as the at-home computer may be identified by device fingerprinting, internet protocol address, or the like. In some embodiments, a request is received through a particular type of channel and/or in a particular manner, such as communication received from a vehicle device, communication sent via email from a home computer, communication sent via mobile application on a user mobile device, etc. The customer may provide additional preferences or have particular history with one channel and/or manner or another, which may be used in recommending points of transaction. Customer preferences also may include a maximum wait time a customer is willing to wait at a point of transaction or a maximum radius that the customer is willing to travel to a point of transaction from the identified location, or maximum fees the customer is willing to pay for a transaction.

Past behavioral data may include any information regarding past transactions such as where the customer typically performs certain types of transactions. For example, if a customer typically deposits checks at a grocery store ATM or consistently withdraws cash at a brick-and-mortar bank, the customer may be directed to a corresponding location for the type of transaction requested. Past behavior relating to similar transactions may be used as well.

Additionally, public data may be accessed in determining and recommending points of transactions or routes to the points of transactions. For example, public data may be accessed to determine the safety of a given point of transaction. Or, for example, if a customer traveling abroad requests a cash withdrawal, the points of transaction capable of completing the transaction, within a given radius, may be given a rank or ordered in a list according to the crime rate associated with that area based on public records. Crime rates may be determined for each possible point of transaction, the crime rate in the local area, and/or crime rate in a predefined area close to the point of transaction.

Additionally, public records may be used to determine the safest route to get to a point of transaction. Public records or information supplied by an entity associated with the point of transaction may indicate which points of transactions are out of service (or the functionality of each is out of service), which have long lines, or any other reason to avoid a point of transaction. Fees associated with the transaction at each point of transaction may be determined from internal or external databases.

Each point of transaction may be given a score based on one or more of the various factors including the crime rate, past behavioral data, or customer preferences.

Mapping module 275 may be configured to provide a map of the recommended points of transaction. The map may be user-customizable and may include directions to the points of transaction.

Unique identifier module 280 is configured to generate a unique identifier for the transaction. In some embodiments the unique identifier is based at least in part on the selected point of transaction. The unique identifier module 280 may be further configured to populate the unique identifier with information relating to the transaction. This unique identifier is communicated to the customer for presentation at the point of transaction. The unique identifier may include an account number, transaction identifier, type of transaction, date and time of when the transaction was staged, staging location, details of the device used, transaction amounts, recipients, window for transaction completion, etc.

Generally, for information security reasons, it is preferable to include less information in the unique identifier. However, various factors may dictate the amount of information to be included. For example, the user may provide a preference of the amount and type of information to be included in the unique identifier. Or the relationship of the transacting entity and the point of transaction and/or the capabilities of the point of transaction may determine the amount of information included in the unique identifier. For example, if the point of transaction has an established relationship (e.g., with an affiliated organization), and/or has signed agreements with the transacting entity, then less information may be required in the unique identifier to complete the transaction. In a further example, the unique identifier may include only a transaction identifier (e.g., a number or alphanumeric code).

Upon presentation of the transaction identifier, with the proper authorization and capability, the point of transaction may directly access the user records using the transaction identifier and retrieve the transaction details to sufficiently complete the transaction without further action by the transacting entity. In some embodiments, the unique identifier includes or is a machine-readable identifier, such as a quick response code or a universal product code.

The unique identifier may contain sufficient information to complete the transaction without accessing the transacting entity's records. In some embodiments, additional information is required and the point of transaction uses the unique identifier to alert the transacting entity and request information relating to the transaction. The transacting entity may then use the unique identifier, or other information, to access the user records to identify the transaction and communicate the information relating to the transaction to the point of transaction for transaction completion. In some embodiments, the unique identifier by itself or in combination with additional identifying information such as the user device is used to authenticate the customer at the point of transaction.

The unique identifier may further include information relating the user's preferences at the point of transaction. For example, the unique identifier may indicate that the user does not prefer receipts, or prefers to receive a receipt showing balances of all accounts, etc. In some embodiments, the transacting entity supplying the unique identifier is a membership organization and the unique identifier is a member identification number. In some embodiments, the unique identifier module 280 is further configured to assign an expiration time to the unique identifier such that if the unique identifier is not used within a certain period of time or by a certain date, the unique identifier cannot be used to complete the transaction. The customer may be required to re-submit the transaction or take some other action to revive the transaction.

Point of transaction detection module 285 is configured to detect when the device is near a possible point of transaction, such as by using a geo-fencing functionality. Point of transaction detection module 285 may be further configured to alert the customer that the customer is near a possible point of transaction after detecting that the device is near a possible point of transaction. The detected possible point of transaction may be the selected point of transaction or it may be a point of transaction that is different than the selected point of transaction. If the detected point of transaction is the selected point of transaction, the selected point of transaction may automatically process the transaction (if additional processing is necessary) such that the user need only authenticate his or her self at the selected point of transaction.

Point of transaction detection module 285 may be further configured to communicate to the customer that the transaction is ready for completion. If the detected possible point of transaction is not the selected point of transaction, the point of transaction detection module 285 may be configured to communicate to the customer that the customer is near a possible point of transaction and that the transaction can be completed at that point of transaction, if the customer chooses. The customer may indicate that the customer will complete the transaction at the new point of transaction. In some embodiments, a new unique identifier may be generated for the new point of transaction and sent to the customer. If so, the original unique identifier may be expired early or deactivated for security purposes.

The user device may be detected to begin completion of the transaction using various methods. For example, the user may keep an application on the device in a continuous transmission mode, broadcasting its location via a mobile application to the transacting entity or points of transaction. If so, when the user is within a predetermined radius of the transacting entity or point of transaction, the transaction may be processed such that the transaction is ready for completion when the user arrives at the transacting entity or point of transaction. In another example, a user may open a mobile application and log on when approaching a transacting entity or point of transaction, thus starting the transmission signaling the user's presence to the transacting entity or point of transaction.

Image receiving module 290 is configured to receive a digital image of a check, insurance document, or other image for a transaction that has been remotely captured by a user (e.g., using a camera or screen capture function on a mobile device). The digital image can be captured at dedicated terminals 110, an ATM in ATM network 115, mobile device 120, personal computer 125, vehicle 135, and/or point of sale (POS) device 130. In some embodiments, image receiving module 290 can request additional images from the user (e.g., if the image cannot be successfully processed).

GUI generation module 295 can generate one or more user interface screens designed to receive user inputs, select accounts for deposit, display the maps from the mapping module 275, and/or process other requests from the customer.

Figure 3:
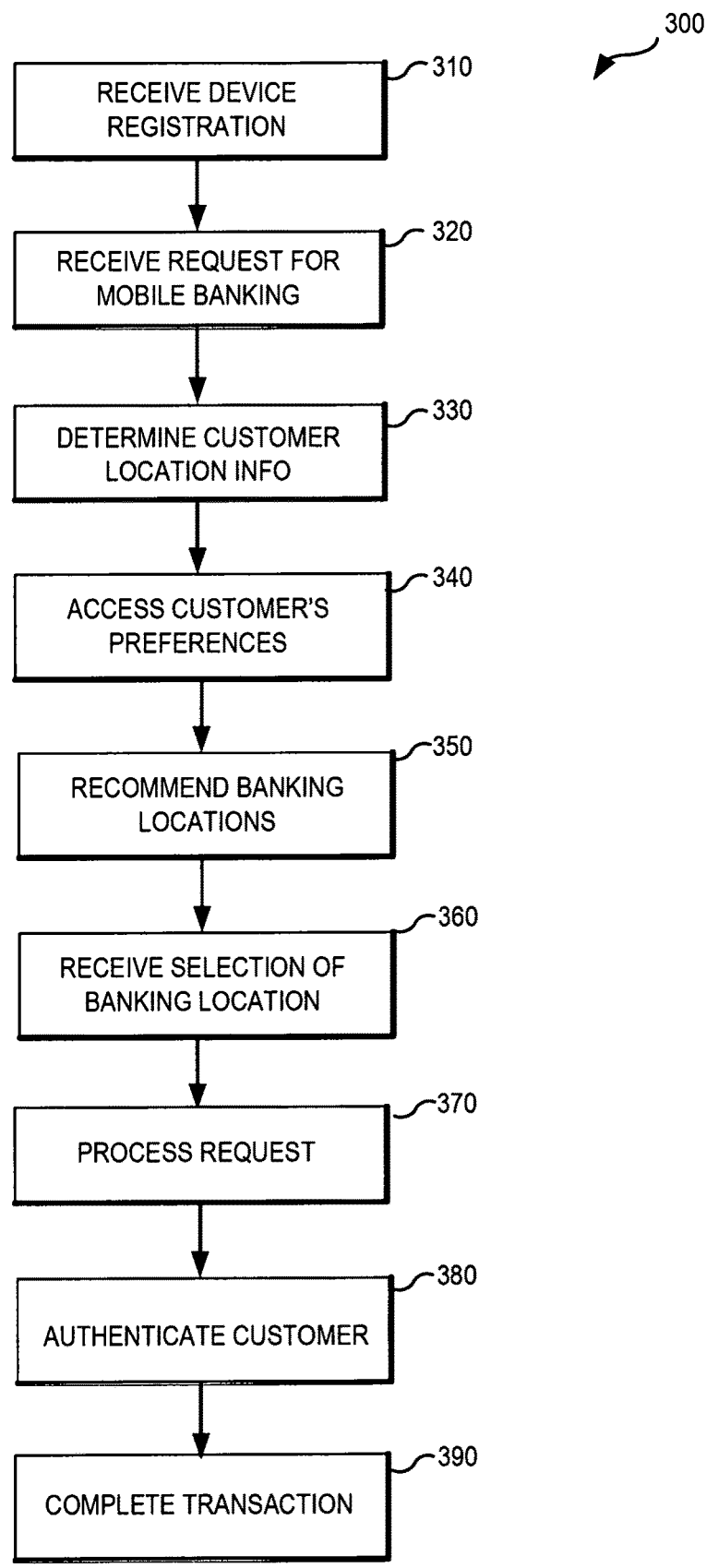
FIG. 3 is a flow chart illustrating a set of operations in accordance with some embodiments of the present invention.

FIG. 3 is a flow chart illustrating a set of example operations 300 for transacting in advance in accordance with some embodiments of the present invention. The operations described with respect to FIG. 3 may be accomplished by one or more of the components described with respect to FIG. 2. Operations described with respect to FIGS. 4 and 5 may be included in FIG. 3. FIG. 3 is described with respect to a banking activity. However, the operations described with respect to FIG. 3 can apply to various other types of transactions in other industries.

In operation 310, a financial institution receives a registration request from a customer to register one or more devices with the financial institution by associating the device with the customer's account. As discussed, registration may include gathering device-identifying information such as a phone number or device fingerprint.

In operation 320, a request for a financial transaction is received from a customer using a registered device. The request may be made via a website (usaa.com), via a mobile application (mobile.usaa), or via a tablet computer (USAA app for iPad). Using the registered device, the customer proceeds with the transaction. In some examples, at this point, the customer may be able to complete an entire transaction. However, in other examples, the customer has initiated and completed a portion of the transaction, but to finish the transaction, the customer or a representative must physically go to a banking location such as an ATM or POS device. For example, the transaction may include the customer cashing a check. Using the customer's registered device, the customer may send an image of the check to the financial institution. The financial institution can process the transaction. However, to receive cash from the check, the customer, or a representative, must physically go to a banking location.

Operations 330-360 illustrate the steps of determining and recommending banking locations to the customer to complete the transaction. In operation 330, location information associated with the transaction completion location is determined and identified. In some embodiments, the customer wants to complete the transaction at a banking location close or within a certain proximity to the customer's current location. The customer's current location is determined using any method known in the art. For example, the customer's device may be capable of determining the customer's location, which may be communicated to the financial institution via an application. Or the customer may provide a current location to the application. The customer may select a location from a map that is presented to the customer.

In other embodiments, the customer may want to complete the transaction at a location other than the customer's current location. The customer may indicate a general area, such as a zip code, or a particular area, such as an address, where the customer would like to complete the transaction. For example, if a third party not in the vicinity of the customer is the recipient of the transaction or will be completing the transaction (i.e. picking up the cash), the customer may provide an address of the third party. Alternatively, an application could retrieve and tag location information from the customer's calendar. Ultimately, the location information regarding where the customer chooses to complete the transaction is used to identify banking locations capable of completing the transaction that are within a user-defined or predefined radius of the identified location. A list of the identified banking locations may be compiled.

In operation 340, customer preferences, past behavioral data, and publicly available data may be accessed to order and tailor the list of banking locations capable of completing the transaction.

In operation 350, the customer is provided with a recommendation of banking locations where the customer may complete the transaction. The recommendation can be based on the information accessed in the databases, including the preexisting preferences, public data, and past behavioral data. The recommendation may include a list of banking locations, including a description of the banking locations, and driving directions, maps, fees associated (if any), safety information, and current wait times based upon pending transactions from customers using a similar technology for each listed banking location.

In operation 360, the customer selects the banking location and communicates the selection to the financial institution. Next, in operation 370, the financial institution processes the selection and schedules the transaction for the selected banking location. Scheduling the transaction may include placing the transaction in a queue, to be completed at a particular time or to be completed at the customer's convenience after providing proper identification to the banking location. Additional information is provided to the selected banking location as necessary. A confirmation message including details about the scheduled transaction and the selected banking location may be sent to the customer. A unique identifier may be sent to the customer that can be used to provide transaction details to the selected banking location and/or authentication purposes.

In operation 380, the customer is authenticated when the customer reaches the banking location. Either or both the banking location and the financial institution may authenticate the customer at the banking location. In some embodiments the banking location is affiliated with the financial institution. The customer may be authenticated by any method known in art, including by supplying an identification card, a pin number associated with a card, information, biometric data, information regarding the registered device, and so on.

In some embodiments, for security purposes, several identifying pieces of information may be used in combination to authenticate the user and to identify the transactions. If the customer received a confirmation email or other communication that included a unique identifier as discussed above, the unique identifier may be used to identify the transaction and/or authenticate the user. The unique identifier may include a quick response code or universal product code that the customer presents to the banking location to authenticate the customer. In a non-limiting example, the user may be asked or required to present the unique identifier only on a device registered with the customer account, and the user may also be required to provide biometric evidence identifying the user (e.g., voice, fingerprint, real-time photograph or video). After authentication, the customer can interact with the banking location to complete the scheduled transaction, as indicated in operation 390. In some embodiments the QR code or a transaction identifier is all that is required for the user to complete the transaction.

Figure 4:
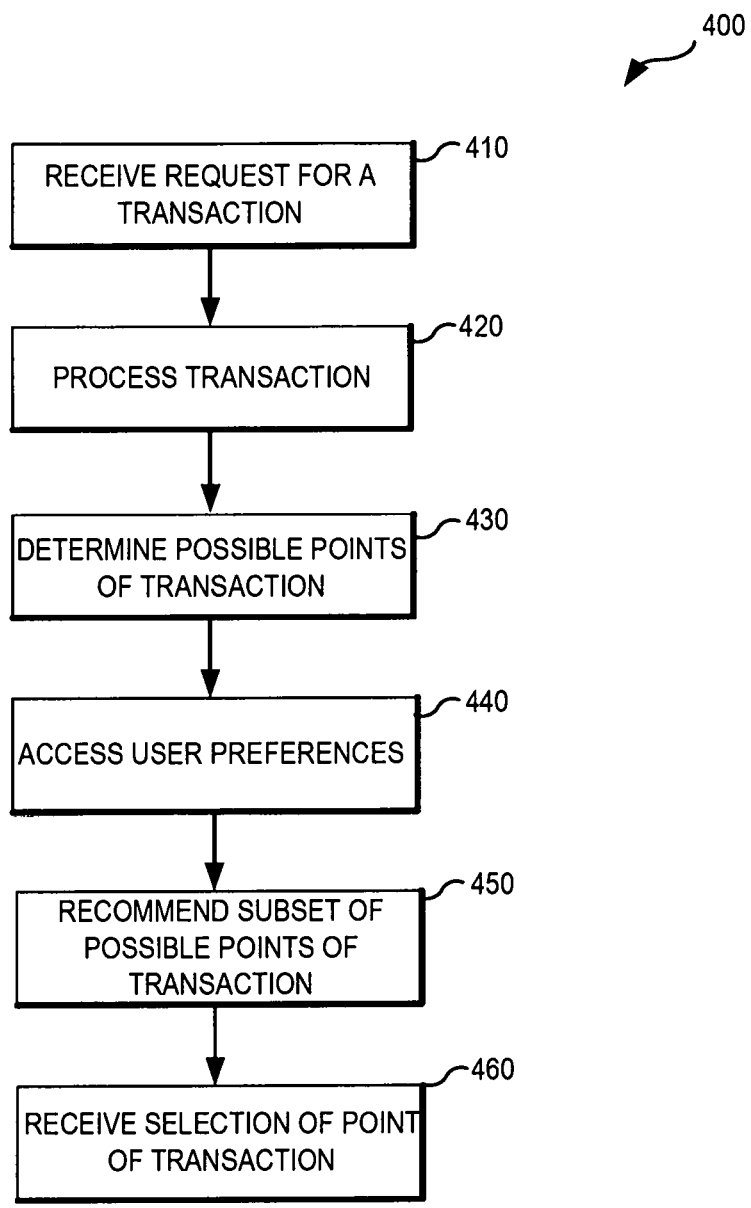
FIG. 4 is a flow chart illustrating a set of operations in accordance with some embodiments of the present invention.

FIG. 4 is a flow chart illustrating a set of example operations 400 for transacting in advance in accordance with some embodiments of the present invention. The operations described with respect to FIG. 3 may be accomplished by one or more of the components described with respect to FIG. 2. Operations described with respect to FIGS. 4 and 5 may be included in FIG. 4.

Receiving operation 410 receives a request for a transaction. The request may be received from a registered user device. In processing operation 420, the request is processed. During the processing operation 420, it is determined that user interaction at a point of transaction is necessary to complete the transaction.

Determining possible points of transaction operation 430 determines possible points of transaction. The possible points of transaction are based on a location of the user (or a location the user indicates the transaction should be completed) and a type of the requested transaction. For example, a possible point of transaction may be a point of transaction within a predetermined radius of the user with the capability to complete the transaction. The possible points of transaction may be determined by a relationship of the point of transaction with the transacting entity, and/or capability.

Accessing operation 440 accesses the user's preferences and/or other information. Such information may include maximum wait times preferred, a type of point of transaction, a point of transaction coordinating with a scheduled location on the user's calendar, points of transaction where previous similar transactions took place, points of transaction used before or during a certain time of day, lighting or other safety information relating to the points of transaction, etc. Information related to registered devices may be accessed. In some embodiments, the customer provides a user preference list identifying the preferred characteristics of the points of transactions.

Recommending operation 450 recommends a subset of possible points of transaction. The recommendation may be based on the information accessed in accessing operation 440. For example, the request may be received from a registered device of the customer. It may be determined that the user prefers a certain type of point of transaction while using the registered device. This information may be used in combination with other information to determine options of points of transactions that would be most helpful to the customer.

Receiving point of transaction operation 460 receives a selection of a point of transaction from the user. Based on this point of transaction, the transaction may be put into a queue for the user so that the user need only provide identification to the point of transaction to complete the transaction. In some embodiments a unique identifier is provided to the user which may serve as the user's identification.

Figure 5:
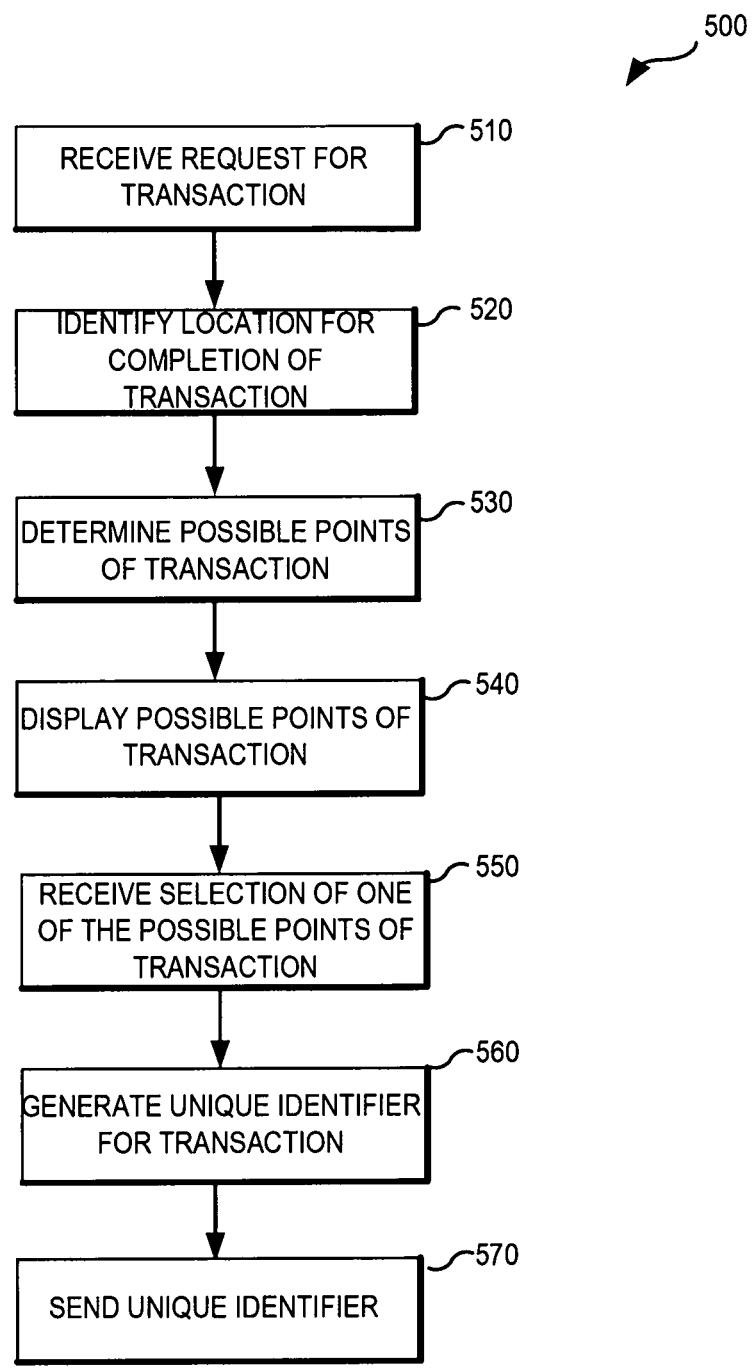
FIG. 5 is a flow chart illustrating a set of operations in accordance with some embodiments of the present invention.

FIG. 5 is a flow chart illustrating a set of example operations 500 for transacting in advance in accordance with some embodiments of the present invention. The operations described with respect to FIG. 5 may be accomplished by one or more of the components described with respect to FIG. 2. Operations described with respect to FIGS. 3 and 4 may be included in FIG. 5.

Receiving operation 510 receives a request for a transaction. The transaction must be completed at a point of transaction. The point of transaction may be a website or it may be a physical location such as an ATM.

Identifying operation 520 identifies a general location for completion of the transaction. The location may be provided by the user such as by user input. The location may be determined by user selection of common locations, or selection of a recipient to complete the transaction, etc. For example, if a customer selects a recipient, a location near the recipient may be provided or determined based on the recipient's registered device or past transactions with the recipient.

Determining possible points of transaction operation 530 determines possible points of transaction within a predetermined distance of the identified location. The predetermined distance may be a user-selectable item or it may be determined by the availability of points of transaction in and around the identified location.

Displaying possible points of transaction operation 540 displays the possible points of transaction. The possible points of transaction may be displayed on a user-customizable map, or the possible points of transaction may be provided in a selectable list.

Receiving point of transaction operation 550 receives a selection of a point of transaction from the user.

Unique identifier generating operation 560 generates a unique identifier for the transaction. The unique identifier may be based on the selected point of transaction, providing additional information if needed to complete the transaction. The unique identifier may include information relating to the transaction such as account numbers, amount information, order information, etc. The unique identifier may be simply a number, or it may be a quick response code or universal product code.

Providing unique identifier operation 570 provides the unique identifier to the user. The unique identifier may be communicated via email, text message, user account on a website, or through a phone call from a representative. In some embodiments, the content of the unique identifier is based on the mode of communication. The unique identifier may be presented to the point of transaction to complete the transaction.

Figure 6:
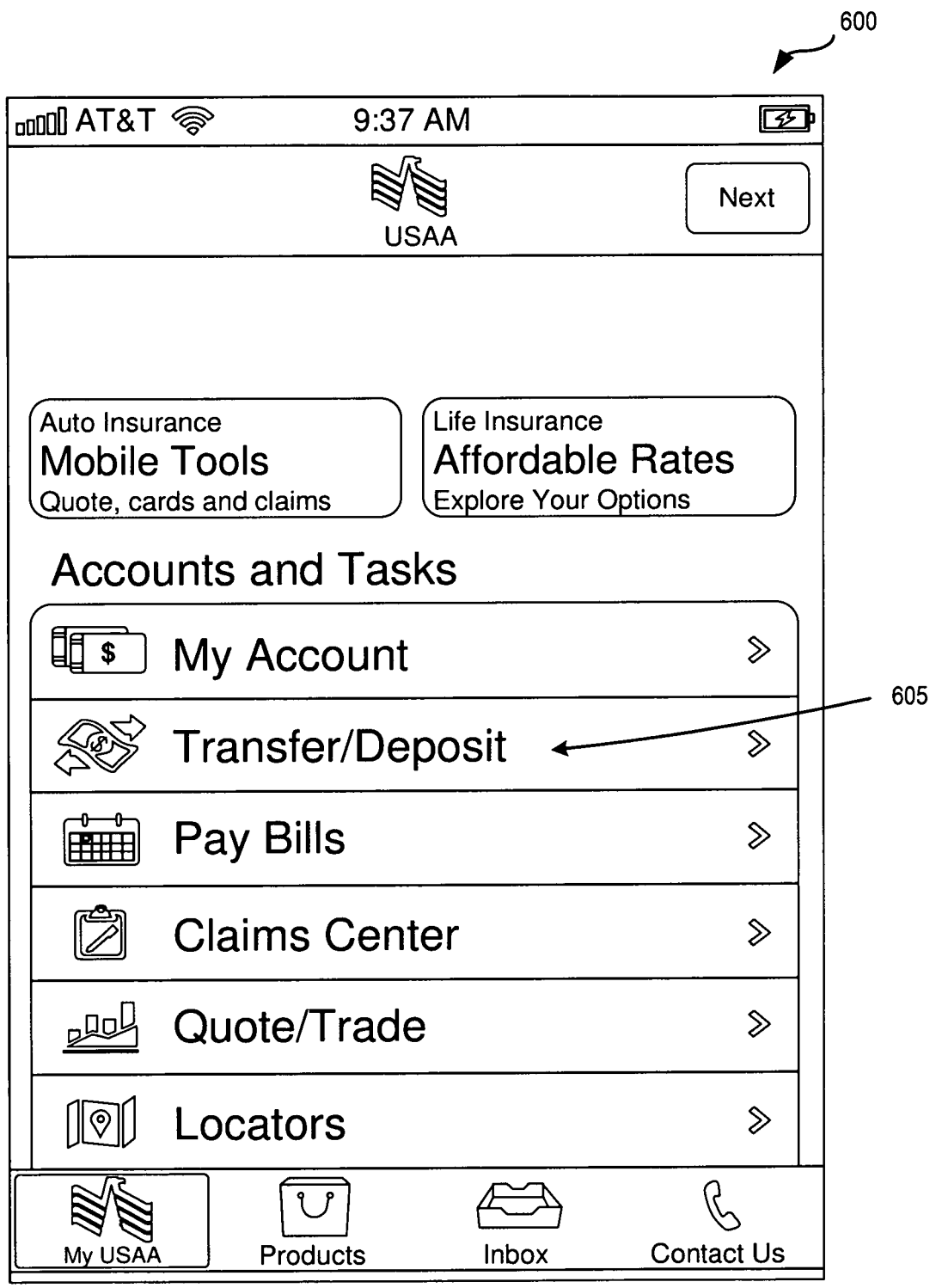
FIG. 6 illustrates an example of a user interface.
Figure 7:
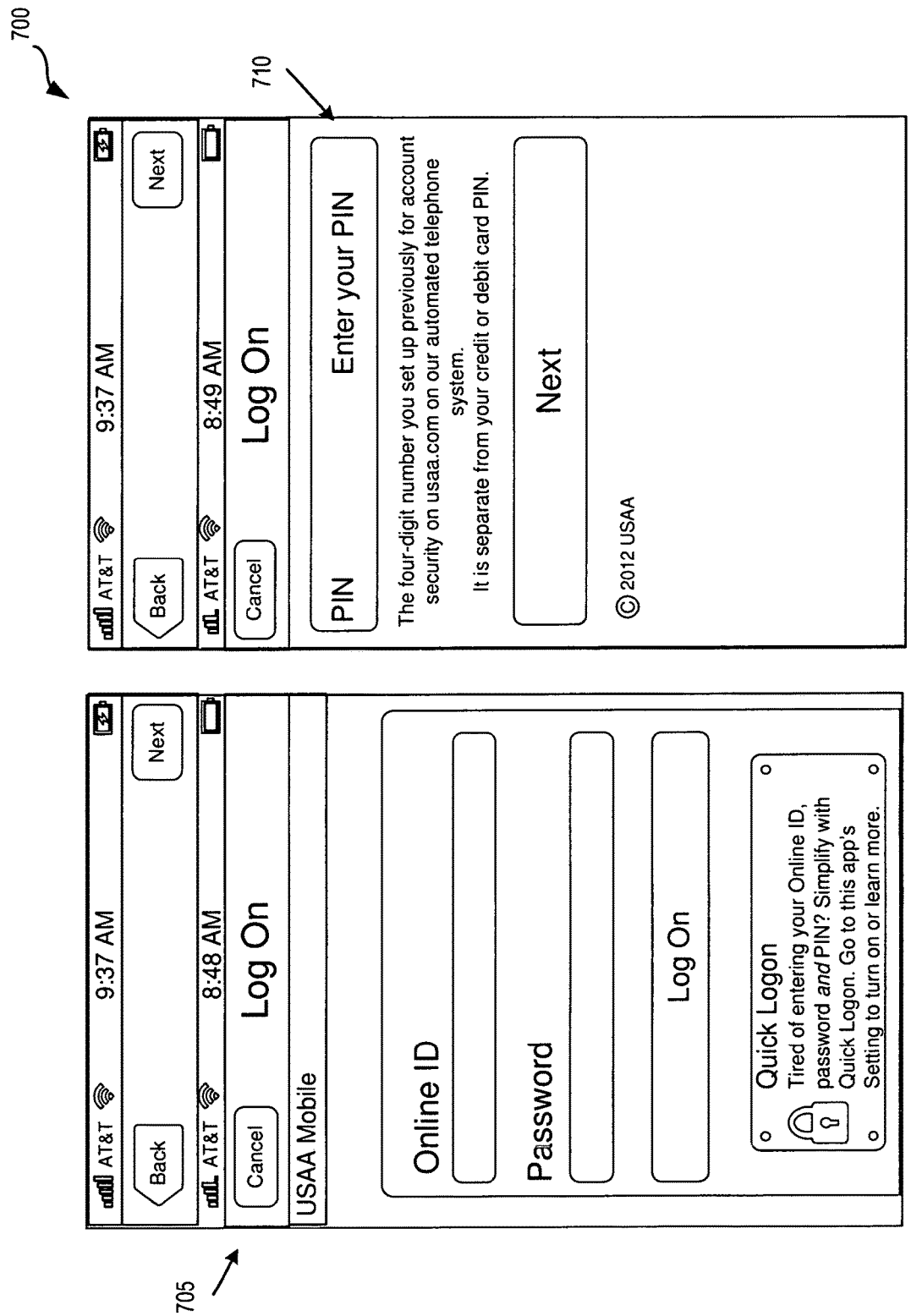
FIG. 7 illustrates examples of user interfaces.
Figure 8:
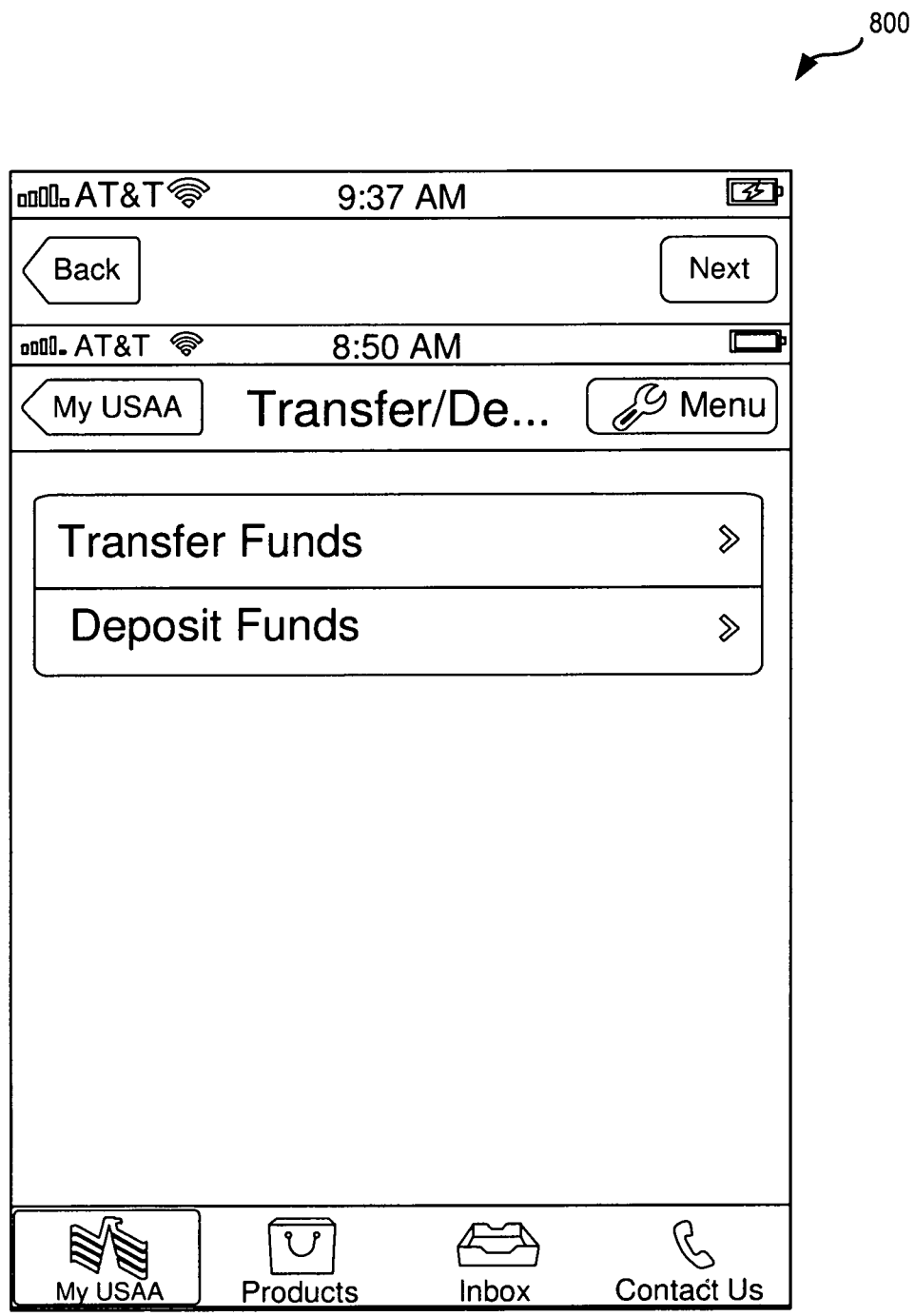
FIG. 8 illustrates an example of a user interface.

FIGS. 6-21 are examples of user interfaces that may be used in various embodiments. For example, the illustration in FIG. 6 is an example menu for the customer to indicate various options with a mobile application, including an option to transfer or deposit funds. Should the user decide to transfer or deposit funds (605), the user may be required to log on as depicted in FIG. 7. FIG. 7 depicts alternative methods of logging on, shown on two alternative user interfaces, one requiring an online ID and password (705), and the other simply requiring a PIN (710). FIG. 8 depicts an example user interface displayed when the user selects the transfer/deposit funds option on the menu.

Figure 9:
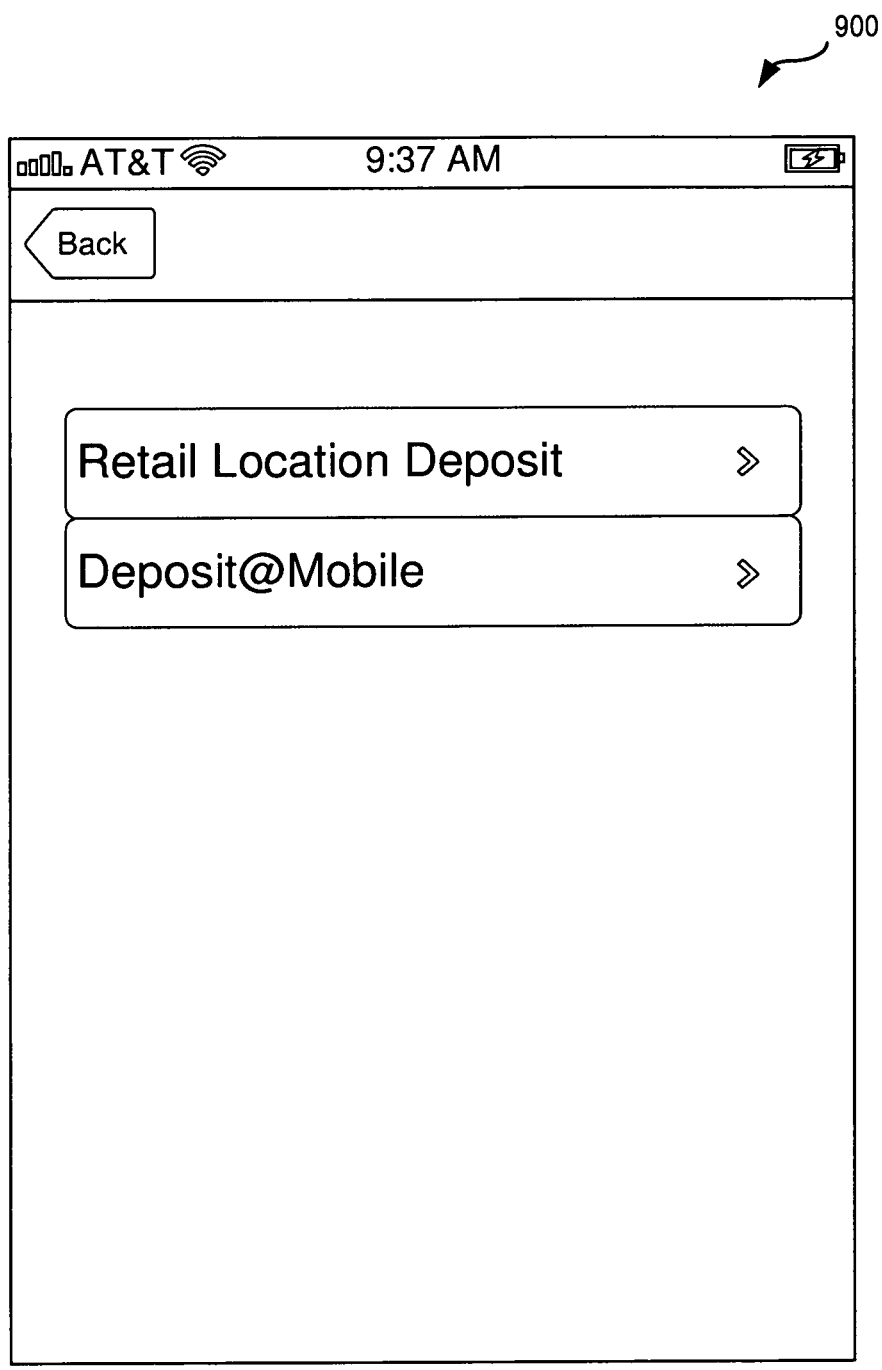
FIG. 9 illustrates an example of a user interface.
Figure 10:
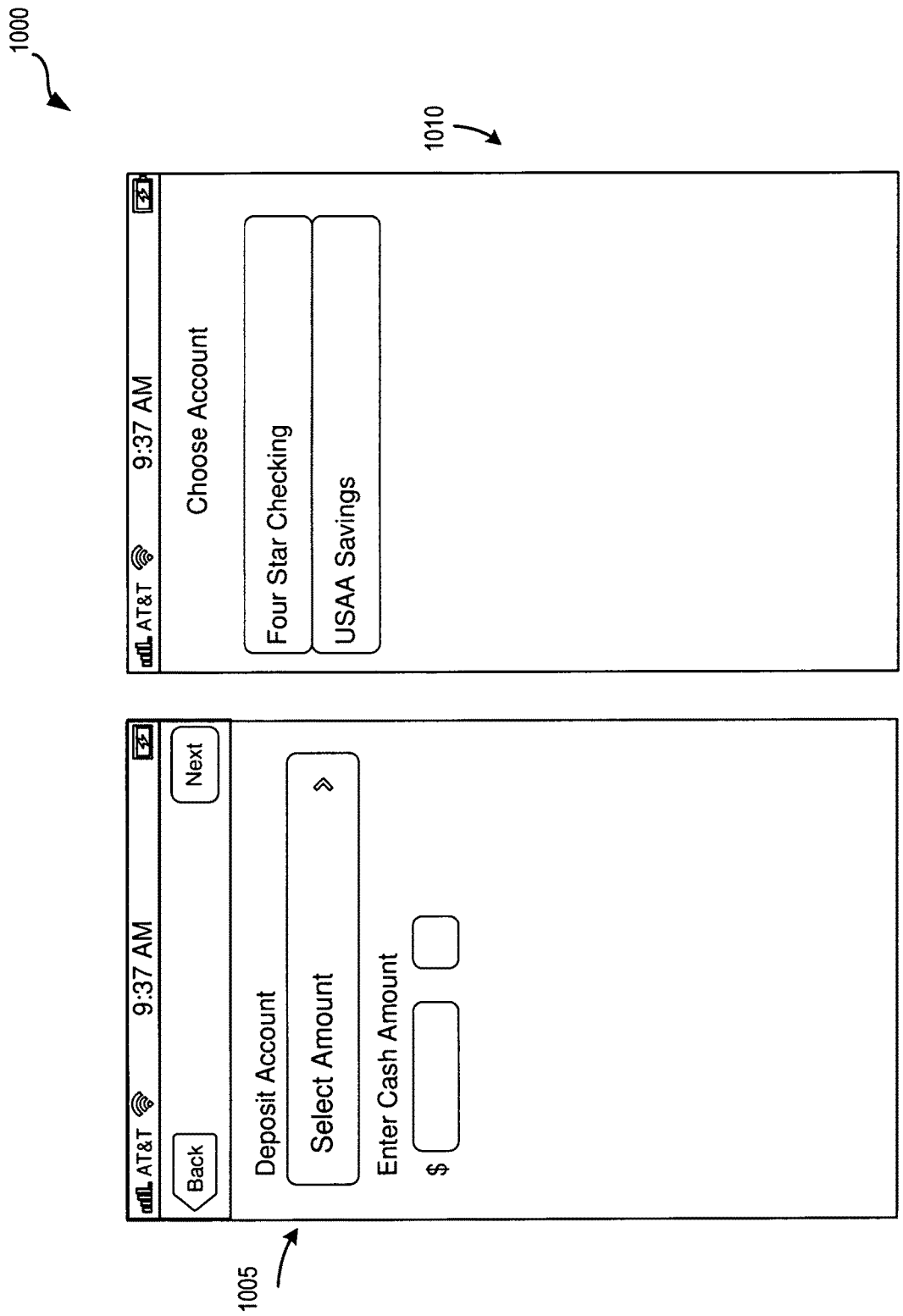
FIG. 10 illustrates examples of user interfaces.
Figure 11:
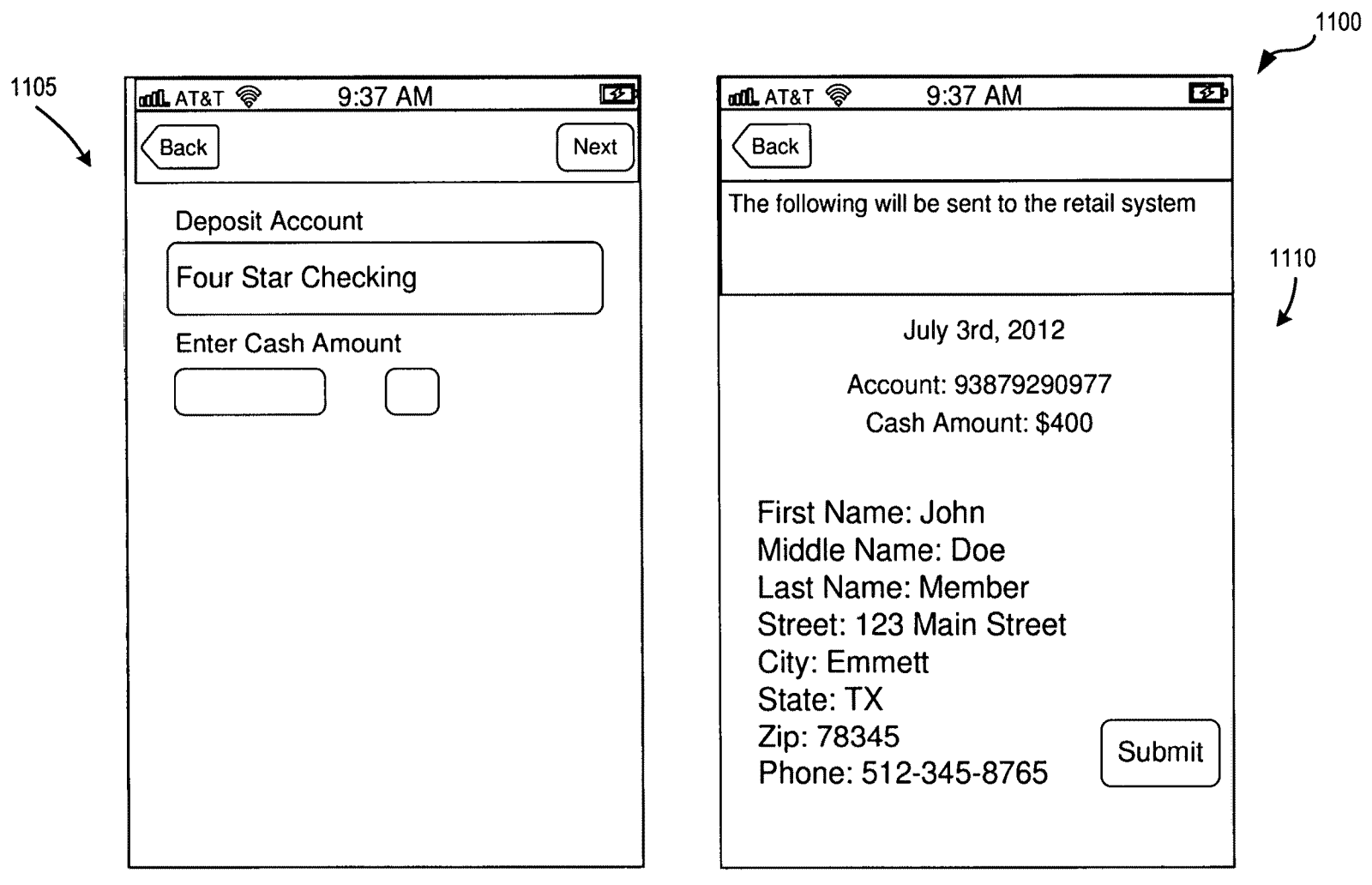

FIG. 9 depicts an example user interface displayed if the user selects deposit funds option. For example, the user may select "Retail Location Deposit" or "Deposit@Mobile." FIG. 10 depicts a user interface allowing the user to select a deposit account, or enter a cash amount (1005). FIG. 10 also depicts a user interface allowing the user to select an account (1010). FIG. 11 depicts a user interface with a selection of a particular deposit account (1105). FIG. 11 also depicts a user interface displaying information pertinent to the transaction and notifying the user that the information will be sent to a retail system (1110).

Figure 12:
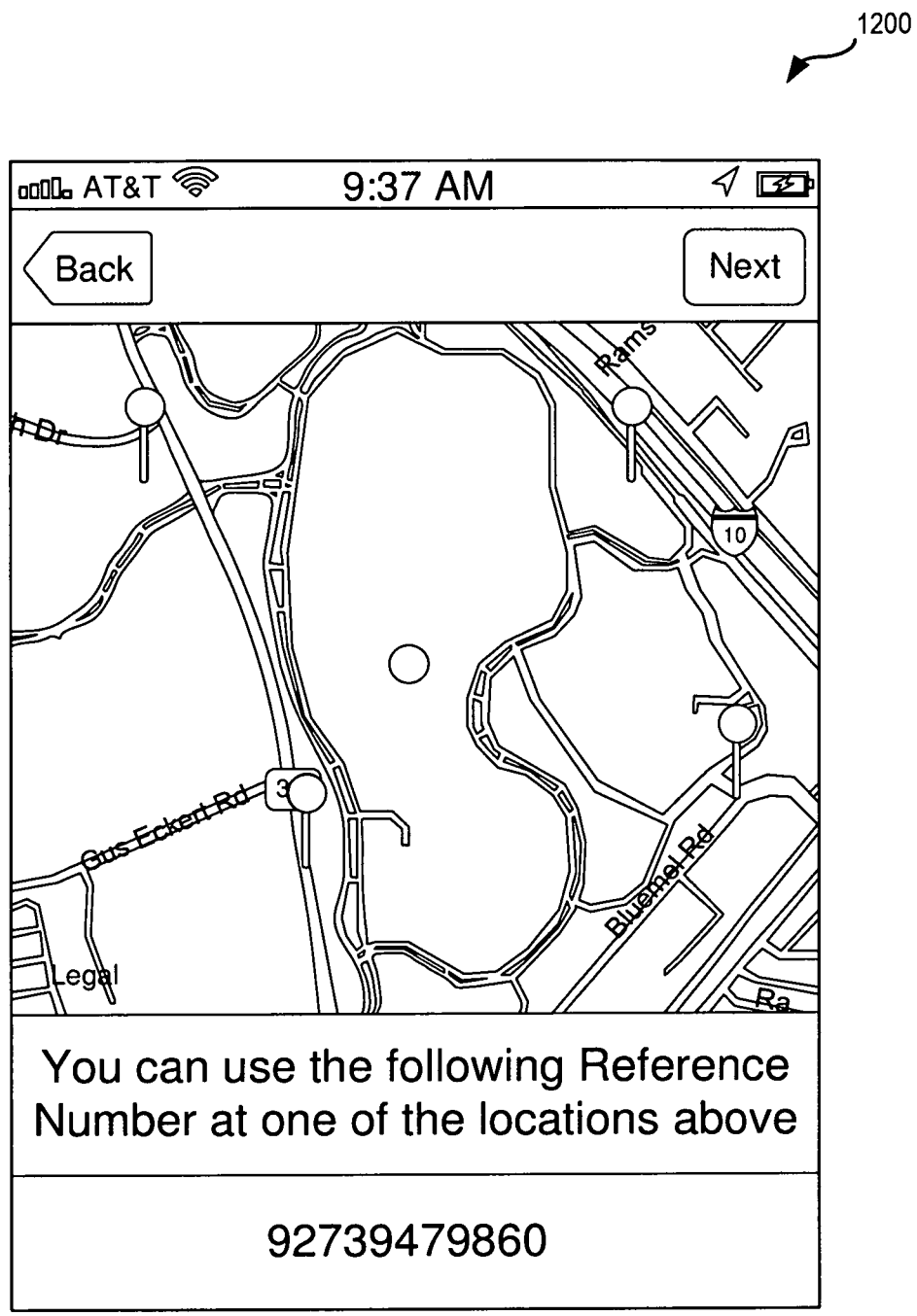
FIG. 12 illustrates an example of a user interface.
Figure 13:
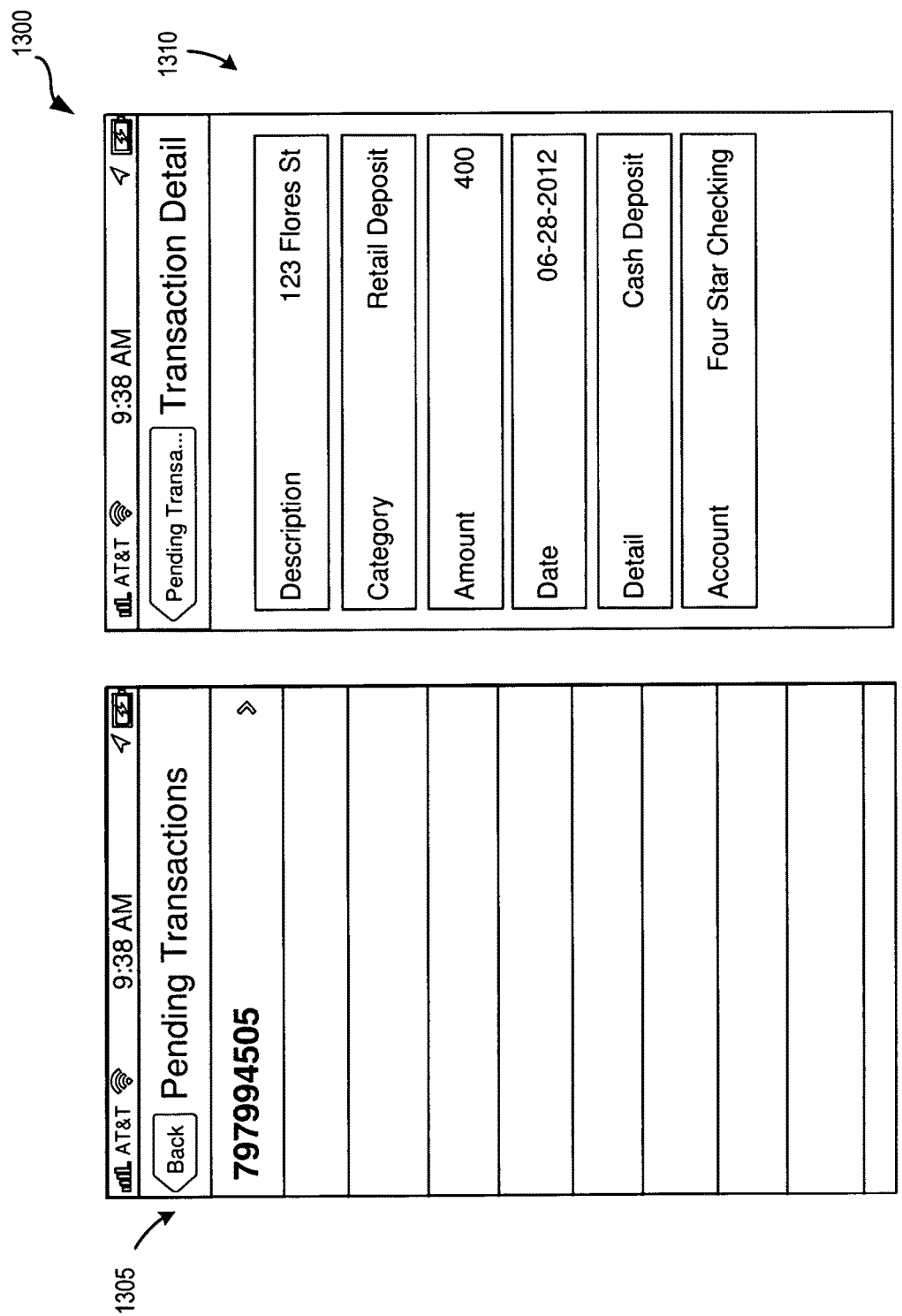
FIG. 13 illustrates examples of user interfaces.

FIG. 12 depicts a user interface displaying a map in which a unique identifier (Reference Number) can be used to complete the transaction. FIG. 13 depicts a user interface listing all pending transactions for the user (1305). FIG. 13 also depicts a user interface showing additional details related to a particular pending transaction (1310). The more specific information displayed in 1310 appears when the user selects the particular pending transaction.

Figure 14:
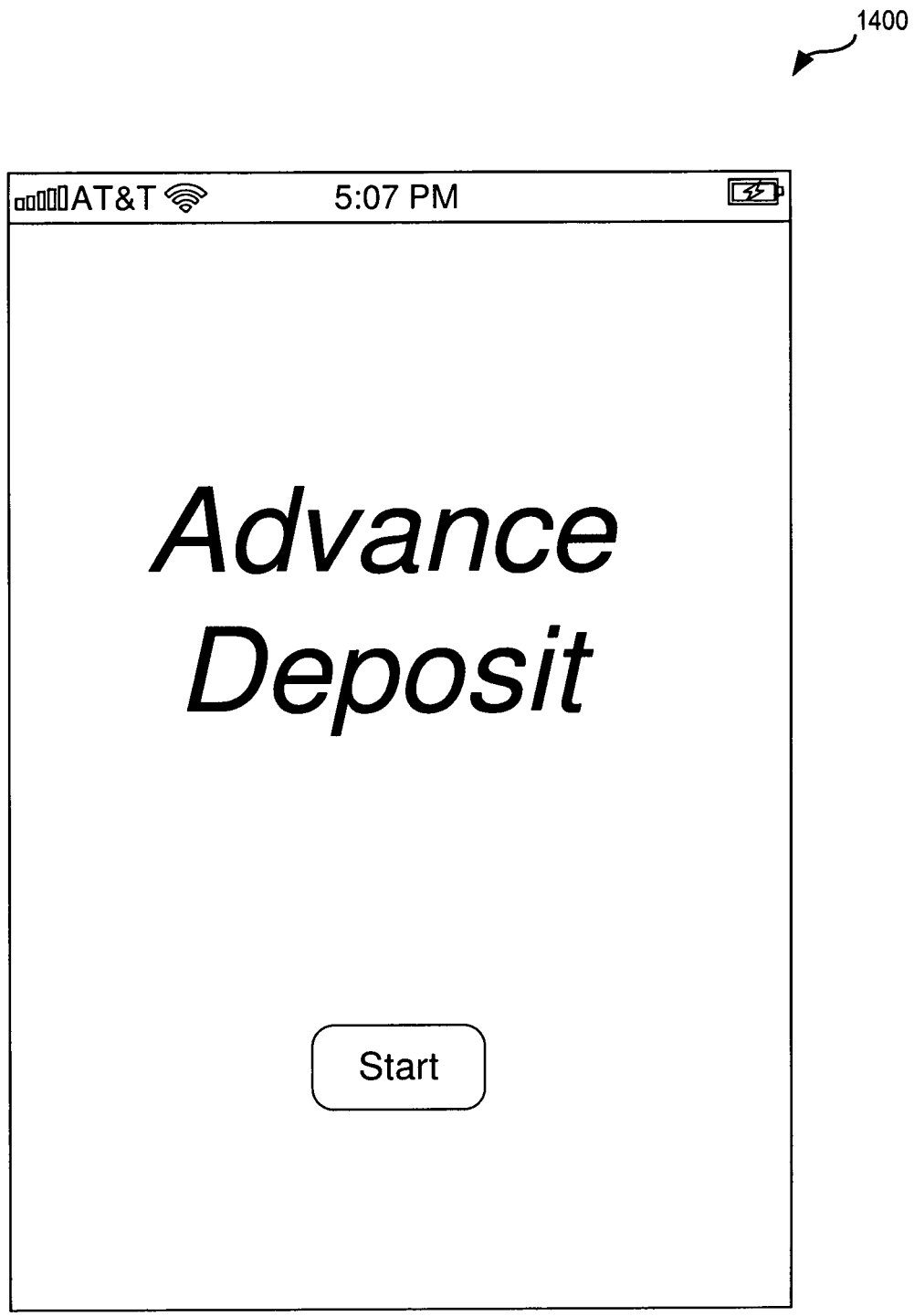
FIG. 14 illustrates an example of a user interface.
Figure 15:
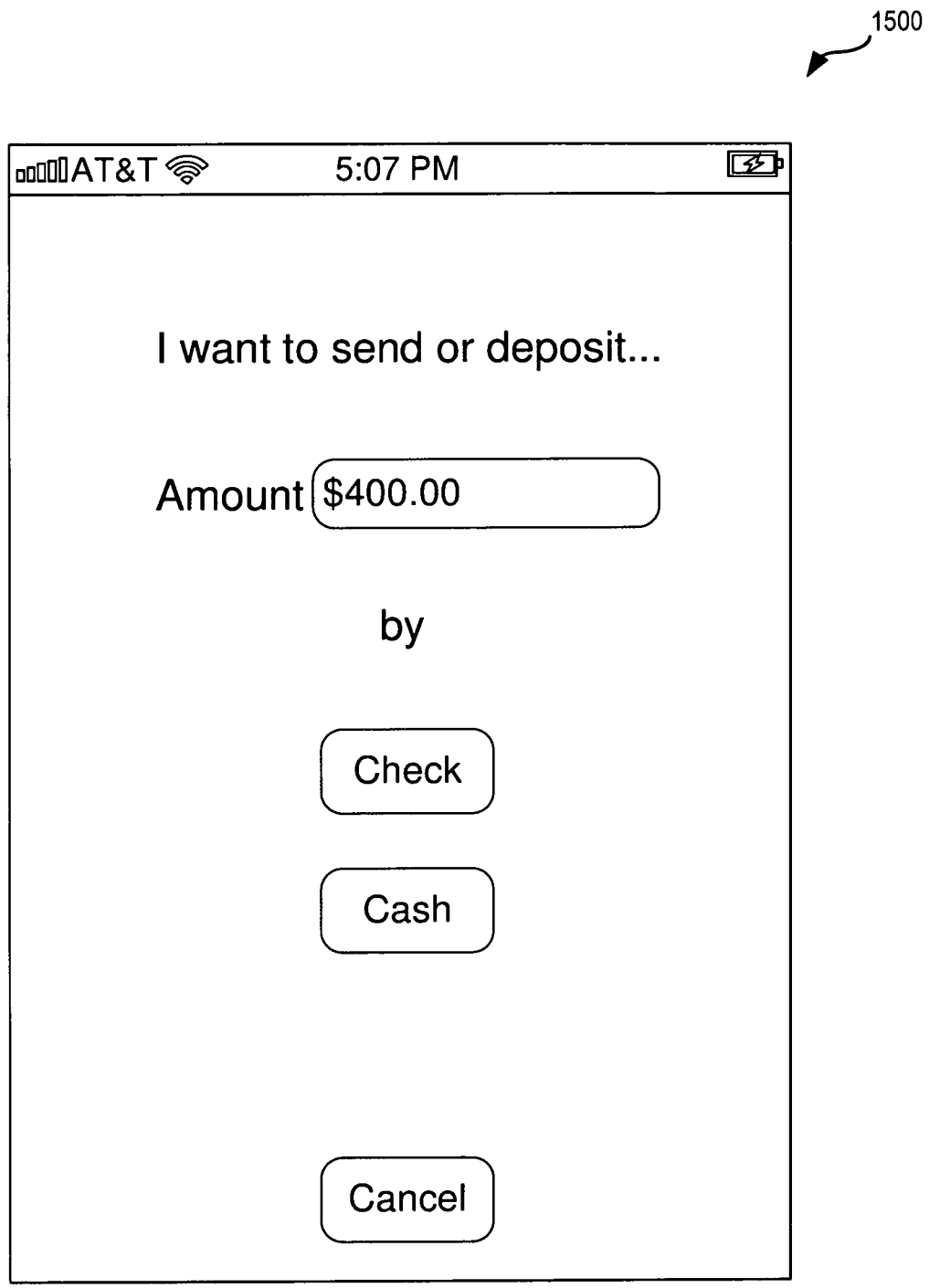
FIG. 15 illustrates an example of a user interface.
Figure 16:
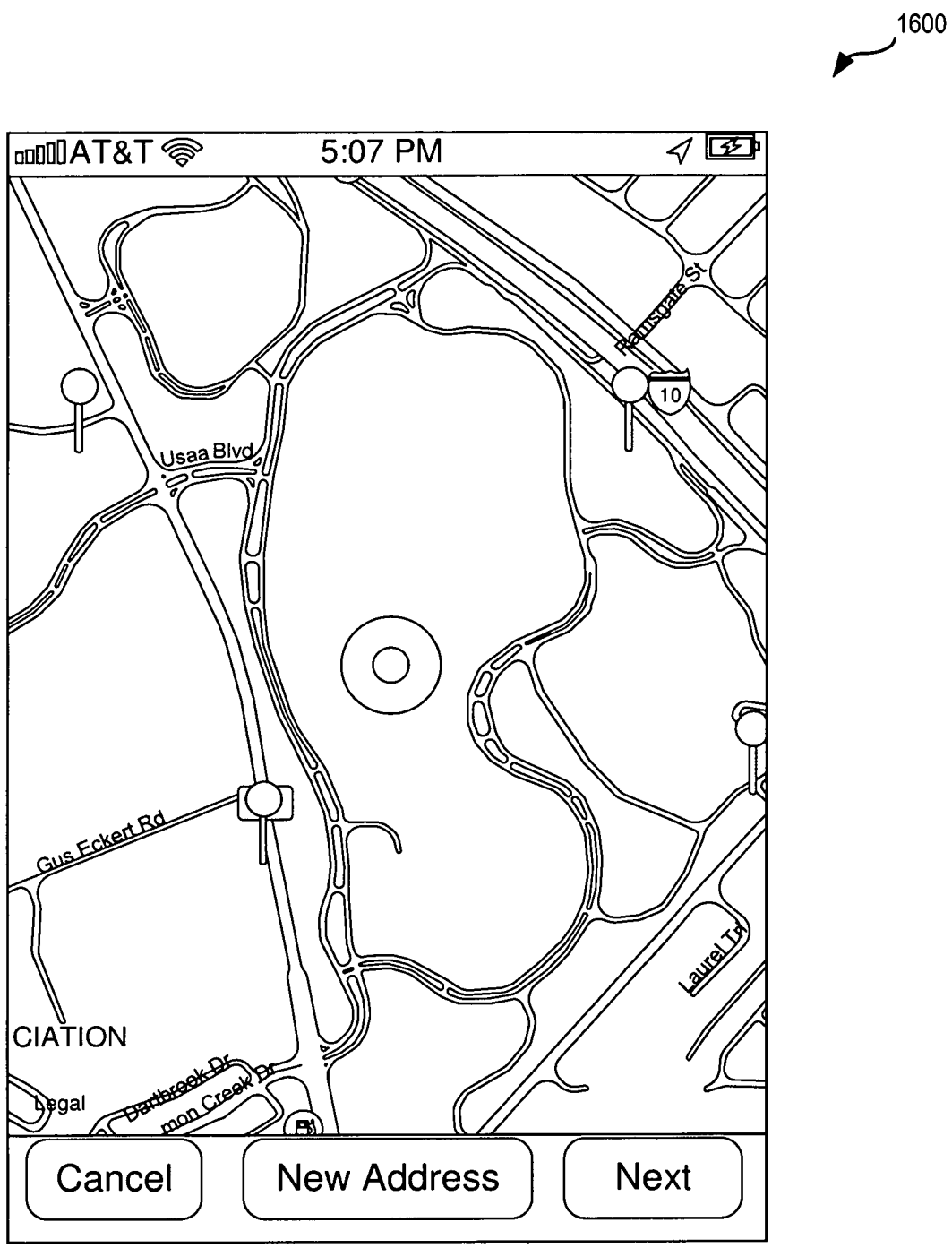
FIG. 16 illustrates an example of a user interface.
Figure 17:
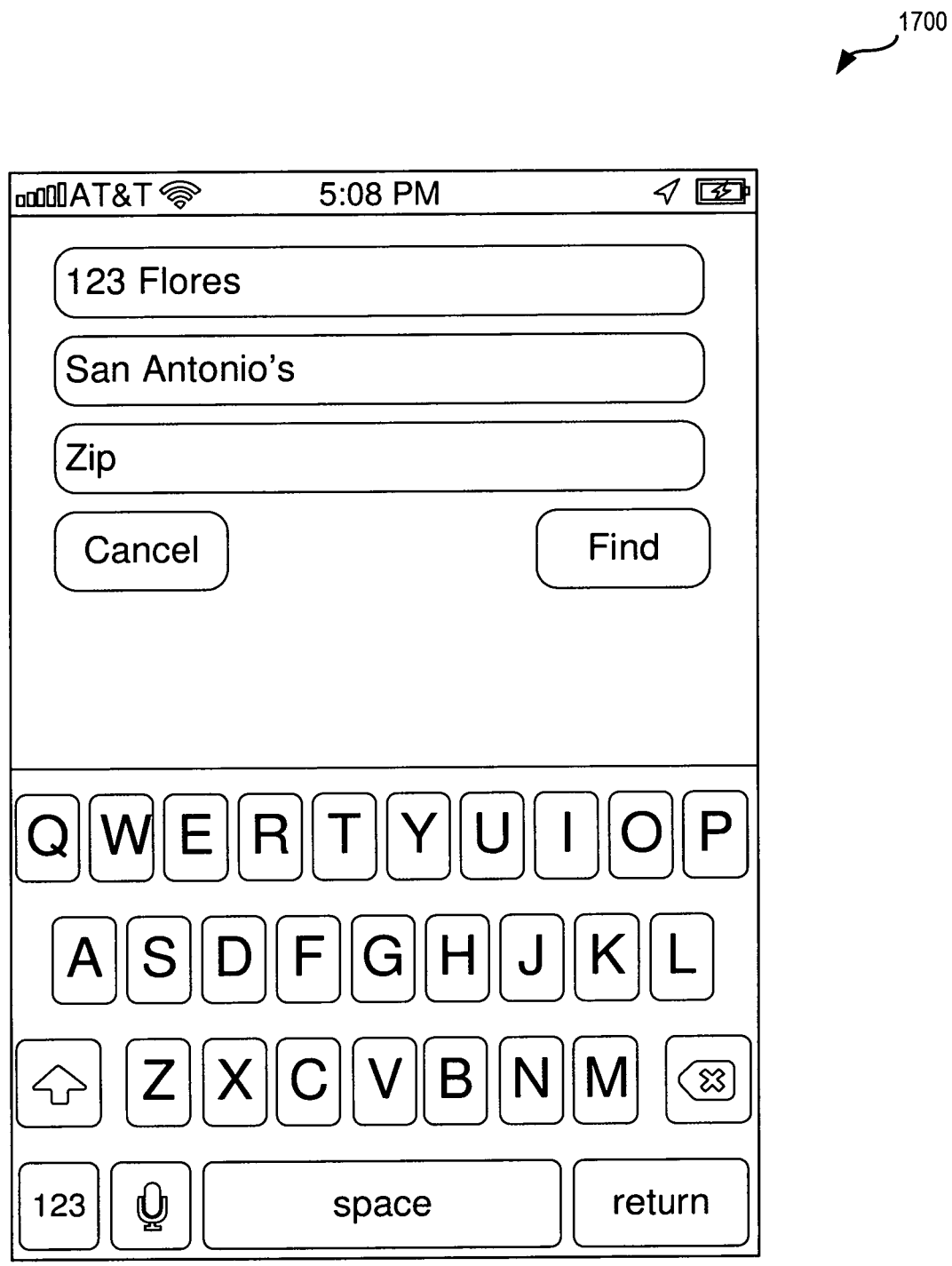
FIG. 17 illustrates an example of a user interface.

FIG. 14 depicts an example user interface for using "Advance Deposit." FIG. 15 depicts a user interface or request for a transaction to send or deposit a user-supplied amount of money. The user may select whether the user is depositing the funds using cash or a check. FIG. 16 depicts a user interface displaying a map depicting several possible points of transaction locations. In some embodiments the points of transaction are user-selectable on the map. FIG. 17 depicts a user interface allowing a user to input an address, specifying the selected point of transaction.

Figure 18:
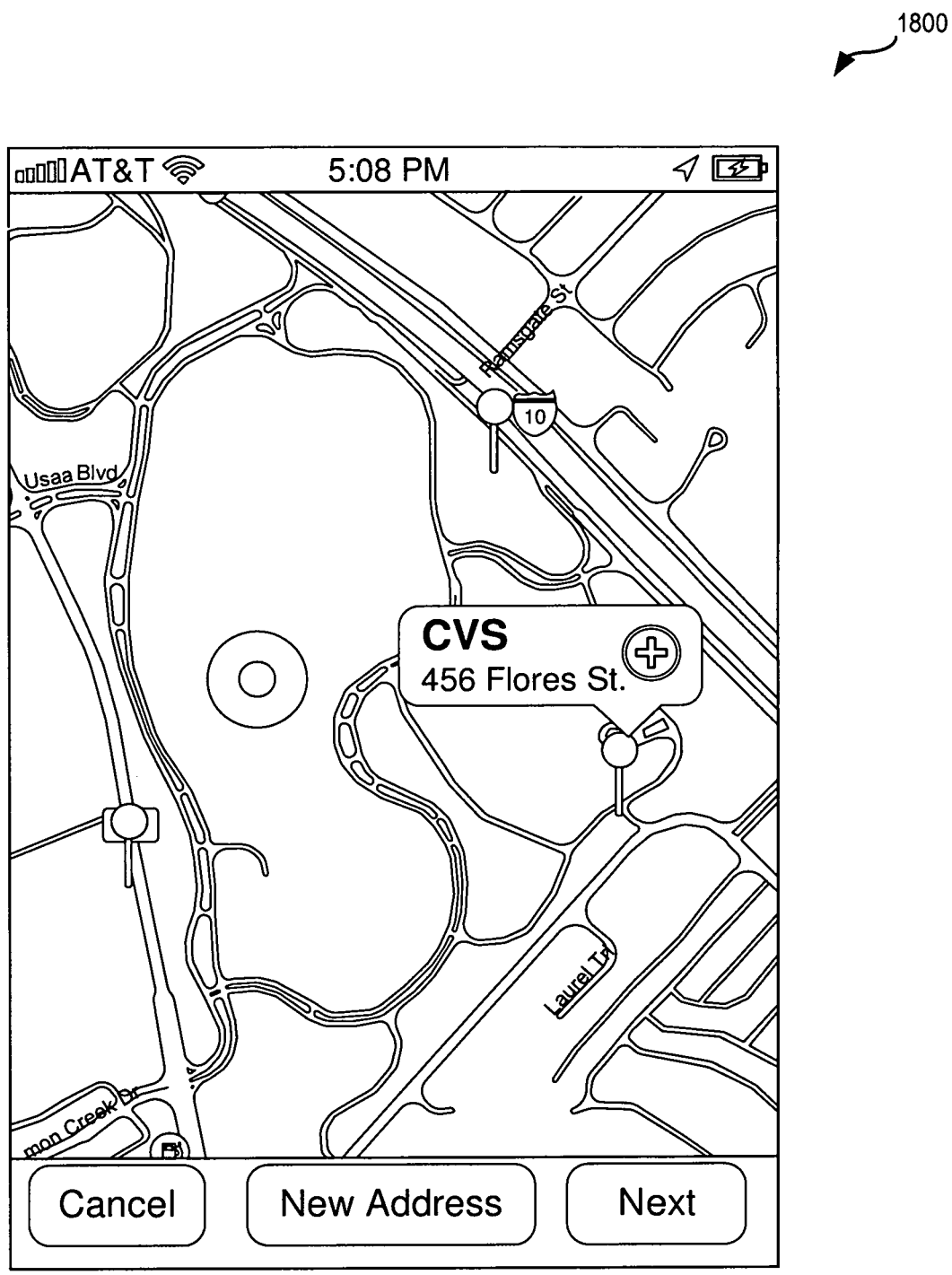
FIG. 18 illustrates an example of a user interface.
Figure 19:
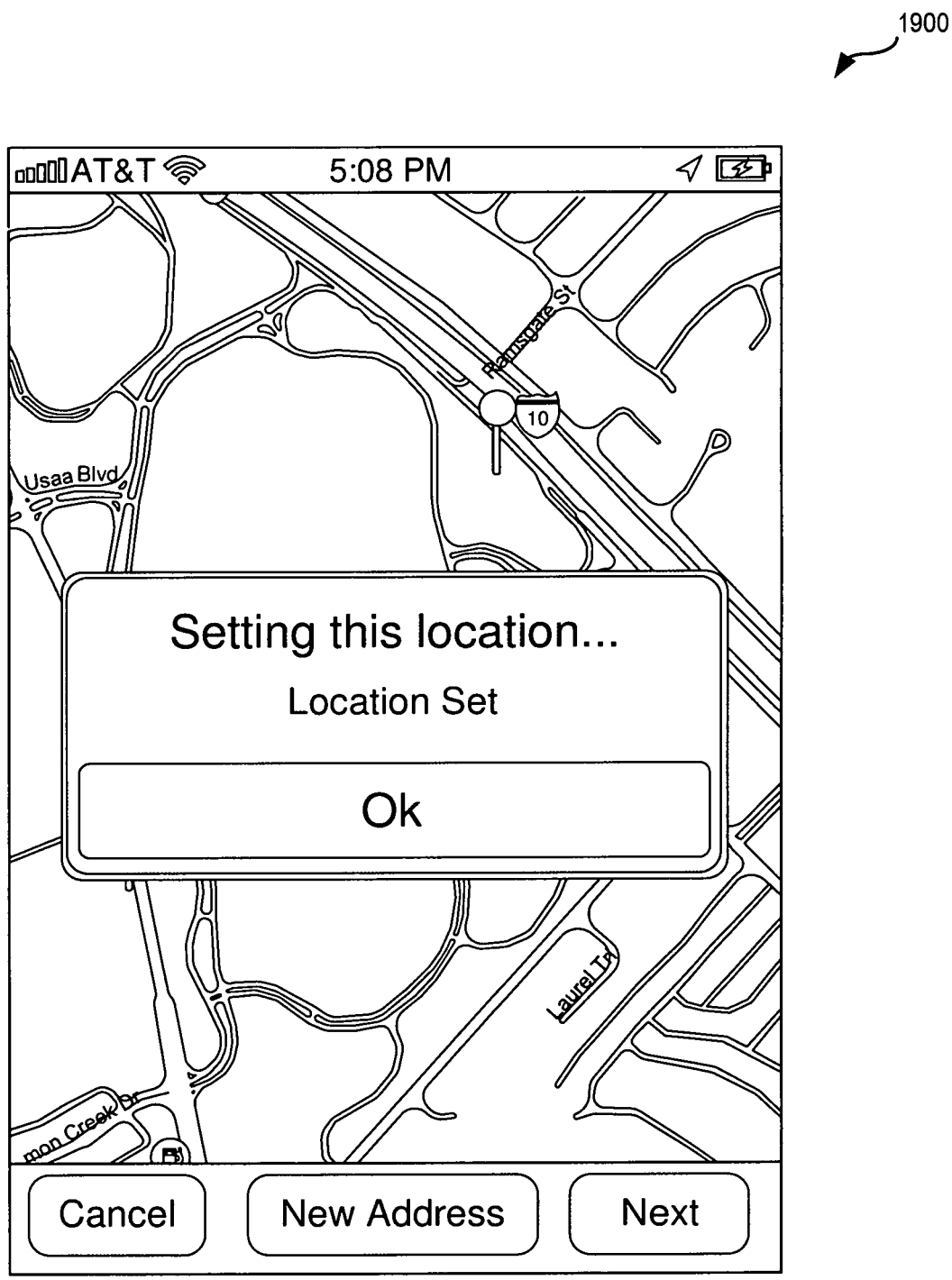
FIG. 19 illustrates an example of a user interface.
Figure 20:
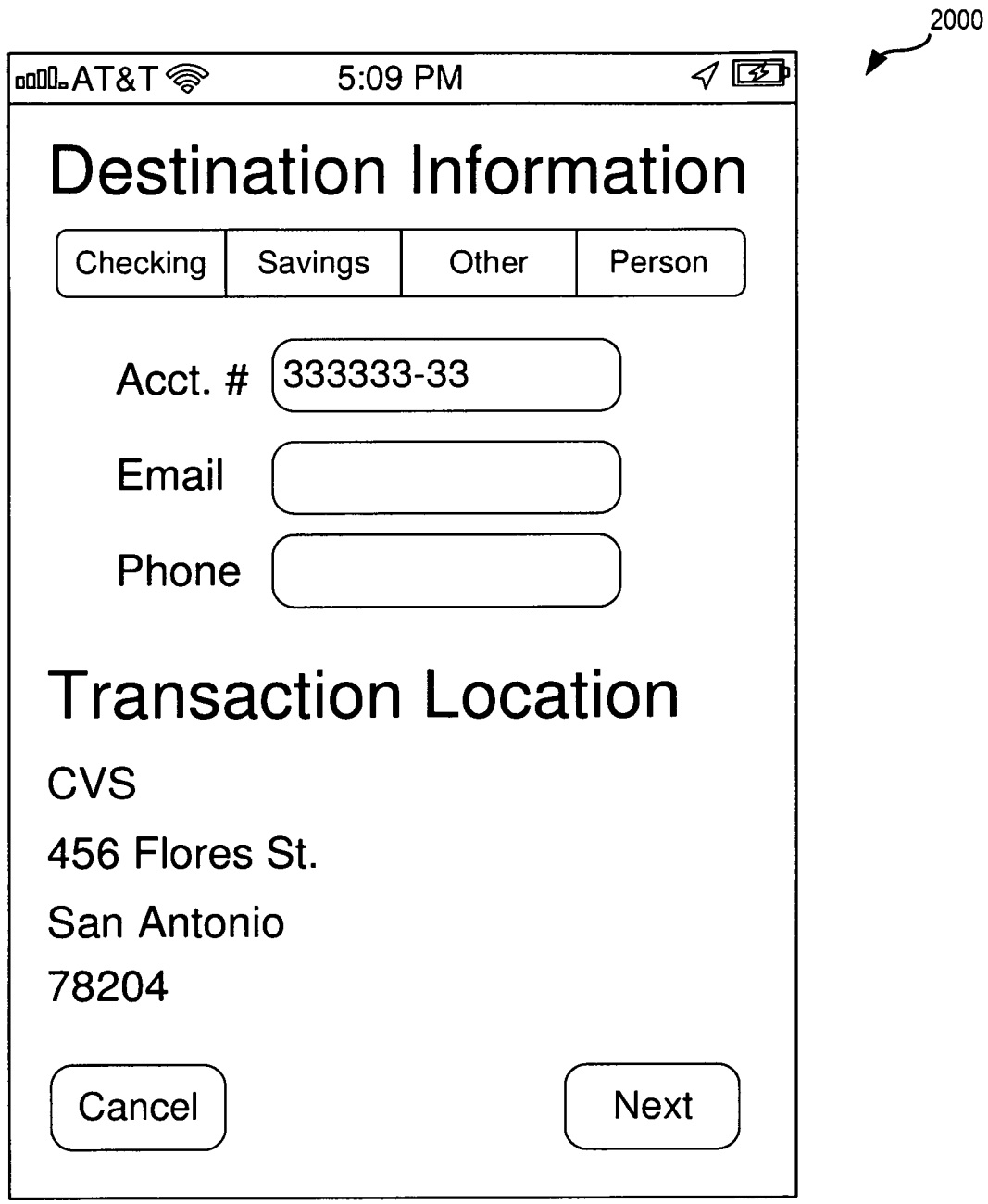
FIG. 20 illustrates an example of a user interface.
Figure 21:
FIG. 21 illustrates an example of a user interface.

FIG. 18 depicts a user interface showing the selected or identified point of transaction. The user interface allows the user to select a new address as well. FIG. 19 depicts a user interface communicating to the user that the location for the point of transaction is set. FIG. 20 depicts a user interface displaying the destination information, which is an account in the example, and the transaction location which includes the name and address of the retail location. FIG. 21 depicts a user interface displaying example of a Quick Response code and a transaction identifier, which together or separately may be a unique identifier. The Quick Response code and/or the transaction identifier may be sent to the user.

In some examples, the transacting in advance system may be used to facilitate a transaction between two different people. In some embodiments, the other person has a registered device associated with the customer's account. This enables another person to use a registered device in a similar manner as the customer, employing the same techniques and methods described above. If, for example, the other person is the recipient of a transaction, after the transaction is requested by the customer, the recipient may use her registered device to locate a banking location and complete the staged transaction.

For example, if a parent wants to send his or her child, a college student living in a different state, some cash to pay for a cab ride home, the parent can schedule a transaction to be completed at a banking location close to the child. The banking location may be selected by the parent or the child using one of the registered devices and the techniques described above. At the selected banking location, the child will provide identification or authentication. The registered device may authenticate the child in some examples. In some examples, the parent or the financial institution may send a code or pin to the child's mobile device or email address. The child may be required to produce the code or pin in order to receive the cash from the banking location. Or, in some embodiments, the financial institution may provide a video or photograph of the person at the banking location to enable the parent to verify that the person at the banking location is in fact the intended beneficiary. The video or photograph may be sent to the parent's mobile device for verification.

Alternatively, the financial institution may provide internal verification by comparing the photo or video with stored data. The parents may include additional instructions to the financial institution to verify the child's identity, such as requiring a driver's license. In some embodiments, the financial institution or the parent may temporarily take over the recipient's mobile device and provide the information necessary to complete the transaction. A confirmation of the transaction may be sent to both registered devices.

If the recipient's device is not pre-authorized or registered, the recipient may provide other identification verification. For example, the recipient may have provided the financial institution identification such as DNA, fingerprint, or a photograph in the past, or can offer such evidence contemporaneously with the transaction.

In an embodiment, fees of the identified banking locations may be assessed and the information may be provided to the customer and to a third party of a transaction, if applicable. In some examples, the fees may be collected from the person initiating the transaction. In some embodiments, the financial institution reimburses the person, if the person is a customer.

To enhance the security of the information passed between customers and the banking location, in some embodiments, there may be an encrypted RF field around the point of transaction. In an embodiment, direct connections between a customer's mobile device and the point of transaction are secured. Alternatively, the communication path between the customer's mobile device and the financial institution's back end system at the banking location is encrypted.

In some embodiments, a transaction is staged such that a vendor or representative of the transacting entity receives or is notified of the transaction. A mobile unit associated with the transacting entity will be notified and will go to a specified location such as the customer's home or office to complete the transaction.

Some non-limiting examples of how customers may use various embodiments of the present invention are described in the following scenarios.

A customer may be waiting in line at an ATM or other point of transaction. While waiting in line at an ATM, the customer stages his or her transaction so that as soon as the ATM becomes available, the customer need only be authenticated for the transaction to be completed. In some embodiments, the customer's mobile device alerts the customer that the customer is near the ATM and asks the customer if he or she would like to complete the transaction.

In a non-limiting example, a customer initiates a transaction while waiting in the drive-up teller window line at the bank. The transaction is processed and ready for completion prior to the customer reaching the teller.

In a non-limiting example, a parent provides cash to a child by transferring money for the child to pick up at a banking location near the child. Alternatively, a retailer may schedule a cash money order to be picked up or delivered at an ATM or other point of transaction.

In another non-limiting example, a customer syncs a calendar to supply information such as location and time for scheduled transactions (e.g., dinner reservations noted in the calendar are scheduled at a certain time and the customer wants to withdraw money from an ATM close to the restaurant; the ATM will be prepared to complete the transaction close to scheduled dinner time).

In another non-limiting example, a person applies for life insurance and completes the application process except the finishing step of providing authentication, which is scheduled to be completed around lunchtime at a point of transaction near the person's office building.

In another non-limiting example, a customer stages a cash withdrawal and is guided to ATMs or banking locations with the lowest fees.

In another non-limiting example, a person traveling abroad requests a transaction and is provided several banking locations with routes to the banking locations, in accordance with the person's preference of banking locations within walking distance.

In another non-limiting example, a customer stages his transaction while waiting in line at the ATM. The customer may receive marketing materials and offers based on the customer's financial needs while waiting in line.

Figure 22:
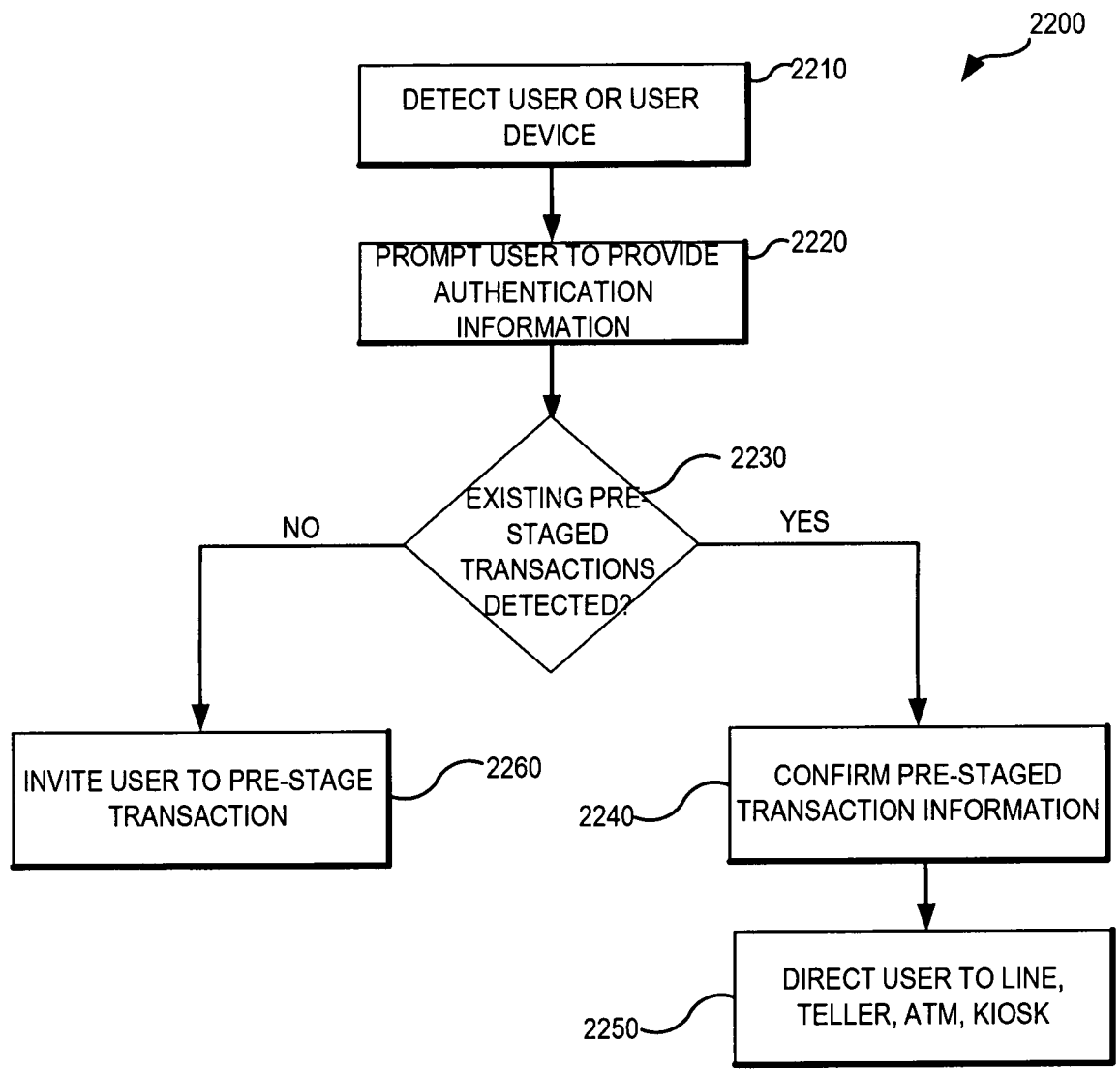
FIG. 22 is a flow chart illustrating a set of example operations for transacting in advance in accordance with some embodiments of the present invention.

FIG. 22 is a flow chart illustrating a set of example operations 2200 for transacting in advance in accordance with some embodiments of the present invention. Additional or fewer operations may be used in various embodiments. Moreover, the operations may occur in different orders than described.

Detecting operation 2210 detects a user at or near a banking location. The detecting may be done actively (e.g., actively monitoring for the user's device) or passively (e.g., responsive to a user action). In an example of active detection, detecting operation 2210 may detect the user's presence by detecting a location of the user's mobile device. Detecting the user's mobile device may occur automatically through a variety of techniques such as geofencing, geolocation, network proximity techniques, etc. In other embodiments, cameras and facial recognition technology may be used to detect a user.

Passive detection—where the presence of the user is detected after the user provides an indication—may also be used. For example, the user can scan a QR code or similar code posted in a strategic location at the entrance to the facility and/or teller queue (e.g., where one would traditionally find a bin of deposit slips in the ATM line or queuing area in the bank lobby) into the mobile device. A mobile application may receive the scanned code and send a message to the transacting in advance system to alert the system of the user's presence at the particular banking location.

In another example of passive detection, the user may display a QR code (or other code) on the user device and present the code to a code reader at the banking location. The QR code may include transaction information and authentication information. In some embodiments, the QR code was generated when the user pre-staged the transaction. The code may be deciphered by the transacting in advance system and used to direct the user to the appropriate area of the banking location.

In a further example of passive detection, the user's device may receive and interpret periodically or continuously transmitted signals. The signals may indicate that the user is within a certain proximity of the banking location. These signals may activate a mobile banking application on the mobile device.

Detection operation 2210 may activate a mobile banking application on the user's mobile device if the mobile application is not already activated. In some embodiments, the user's mobile device may be automatically directed to a pre-staging webpage or tab where the user can view pre-staged transactions and/or pre-stage a transaction.

Prompting operation 2220 may prompt the user to provide authentication information (e.g., PIN, code, screen signature, biometric signature, etc.) into a mobile application on the user's device. In some embodiments, authentication is required prior to viewing the pre-staging transactions page or tabs. Transaction operation 2230 determines whether there are any existing pre-staged transactions associated with the user or the user account. Pre-staged transactions may be stored in a database. The database may be queried upon detection of the user device. Determining existing pre-staged transactions operation 2230 may occur simultaneously with prompting operation 2220.

If pre-staged transactions are detected, confirmation operation 2240 sends a customized message to the user confirming the pre-staged transaction. The customized message may include transaction details such as a date and time the transaction was pre-staged, a type of the transaction, amount of funds and/or an account involved in the transaction, etc. The user may be asked to confirm the information relating to the pre-staged transaction and/or confirm that the user desires to complete the transaction at the banking location. For example, if the user has pre-staged a transaction to generate a cashier's check, the user may be asked whether the user would like to complete this transaction. If the user indicates that the user wants to complete the transaction, then the user may be asked to confirm the amount of the cashier's check, an account to be withdrawn from, and the payee's name.

Directing operation 2250 may send a message to the user directing the user to a particular line, teller, ATM, or kiosk. The line, teller, ATM, or kiosk may be based upon a skill/specialization of the employee in the type of services the user has pre-staged, or it may be based upon a wait time. In some embodiments, the user may be alerted to a shorter line based on current average queue wait times. Wait times may be determined by sensors (e.g., weight sensors) or cameras monitoring the banking location.

In some embodiments, the pre-staged transaction may be gathered or fulfilled by one or more machines before the customer even reaches the teller, ATM, or kiosk. For example, the cashier's check may be pre-printed, cash may be pre-counted and/or bundled, requested documents may be prepared and gathered, etc. The teller computing device, ATM, or kiosk may be configured to receive a message regarding the pre-staged transaction and take actions to complete the transaction. In some embodiments, the teller's screen is prepopulated with the transaction information.

If no pre-staged transactions are detected, inviting operation 2260 invites a user (e.g., via a mobile application) to begin pre-staging the transaction while waiting in line. If the user accepts the offer, the mobile application may detect which banking location the user is at or near, and may provide banking location and/or transaction options accordingly in operation 2250. After pre-staging the transaction, the user may be directed to an appropriate line, teller, ATM, or kiosk. In some embodiments, the user may be directed to a different banking location if the services (e.g., foreign currency exchange) are not available at the current location.

Examples of pre-staged transactions include, but are not limited to, check deposits, cash transactions, teller checks, MoneyGrams, remote cash person to person using ATMs, as well as other transactions.

Figure 23:
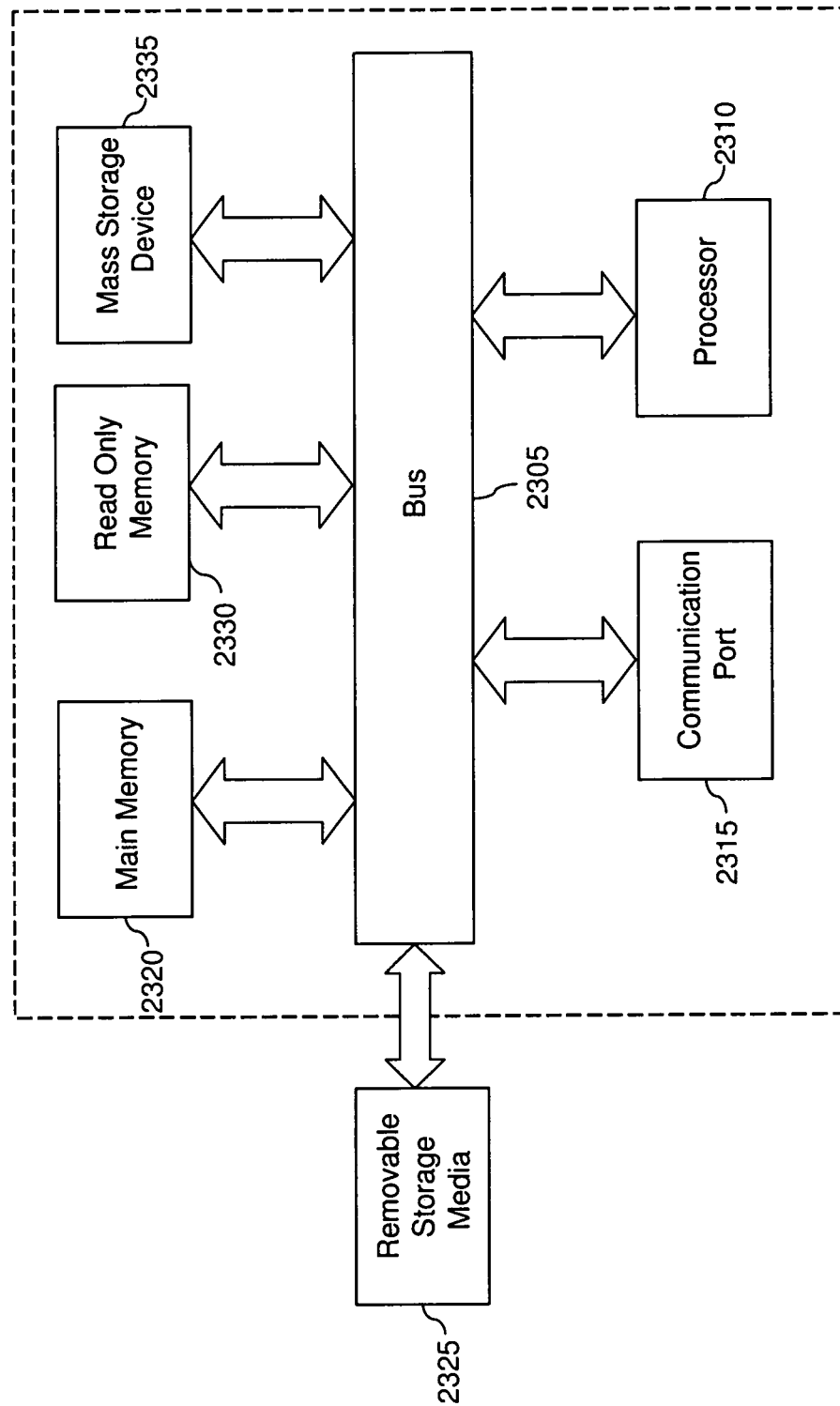
FIG. 23 is a flow chart illustrating a set of example operations for transacting in advance in accordance with some embodiments of the present invention.

FIG. 23 is a flow chart illustrating a set of example operations 2300 for transacting in advance in accordance with some embodiments of the present invention. Additional or fewer operations may be used in various embodiments. Moreover, the operations may occur in different orders than described. One or more of the operations can be performed by various components in FIG. 2 such as memory 210, one or more processors 220, device registration module 230; processing module 240, location determination module 250, point of transaction module 260, information module 270, mapping module 275, unique identifier module 280, point of transaction detection module 285, image receiving module 290, and GUI generation module 295.

In opt-in operation 2305, a financial service customer opts-in to location-based services for mobile devices, allowing a financial services organization to determine when a customer is within a distance of a service center location (e.g., a bank lobby). The customer may opt-in using a web portal, mobile application, etc. In detection operation 2310, the financial service application detects that the device's/customer's location is within a certain distance of a service center. After identifying that the customer is within the distance of the service center, the financial service application checks for any pre-staged orders associated with the customer in checking operation 2315.

When the customer has pre-staged a transaction, the financial service application confirms the availability of a pre-staged transaction and sends a welcome message to the customer in greeting operation 2320. Checking the availability of the pre-staged transaction order may include confirming that the banking location has the proper equipment or personnel present to complete the transaction. Checking the availability of the pre-staged transaction may also include determining an approximate wait time for completion of the transaction.

In messaging operation 2325, a message is sent to the customer's mobile device confirming that the pre-staged transaction has been completed and providing instructions and/or information to the customer (e.g, "your Cashier's check order is ready for pickup at either the self-service kiosks or a teller (current teller wait time is 9 minutes"). In authentication operation 2330, the customer authenticates by providing a PIN, voice password, biometrics, or other authenticating information based on business rules and/or customer set authentication limits. In some embodiments, the level of authentication required is based on the type of transaction.

In initiating operation 2335, the customer scans a QR code (or other similar code) at the kiosk or bank teller computing device using the device to confirm presence or initiate the transaction delivery. Upon receipt of the QR code, in acknowledging operation 2340, the financial service application acknowledges completion of the transaction and notifies the customer of the delivery method of the electronic record of transaction based on the customer preferences. For example, if the customer has identified a preference for email receipts/confirmations, the receipt/confirmation will be delivered to an email address associated with the customer.

When the customer has not pre-staged a transaction, the financial service application confirms that the customer does not have any transactions pending and sends a welcome message to the customer in greeting operation 2345. In messaging operation 2350, the customer may be informed of an approximate wait time and asked (via the mobile application) if the customer would like to begin the transaction while waiting in line. In some embodiments, the question regarding beginning the transaction while waiting in line may appear only if the wait time is over a threshold wait time. The customer authenticates by providing a PIN, voice password, biometrics, or other authenticating information based on business rules and/or customer set authentication limits in authentication operation 2355 to the mobile application. The transaction is completed and a confirmation or receipt is delivered as described above in initiating operation 2335 and acknowledging operation 2340.

Figure 24:
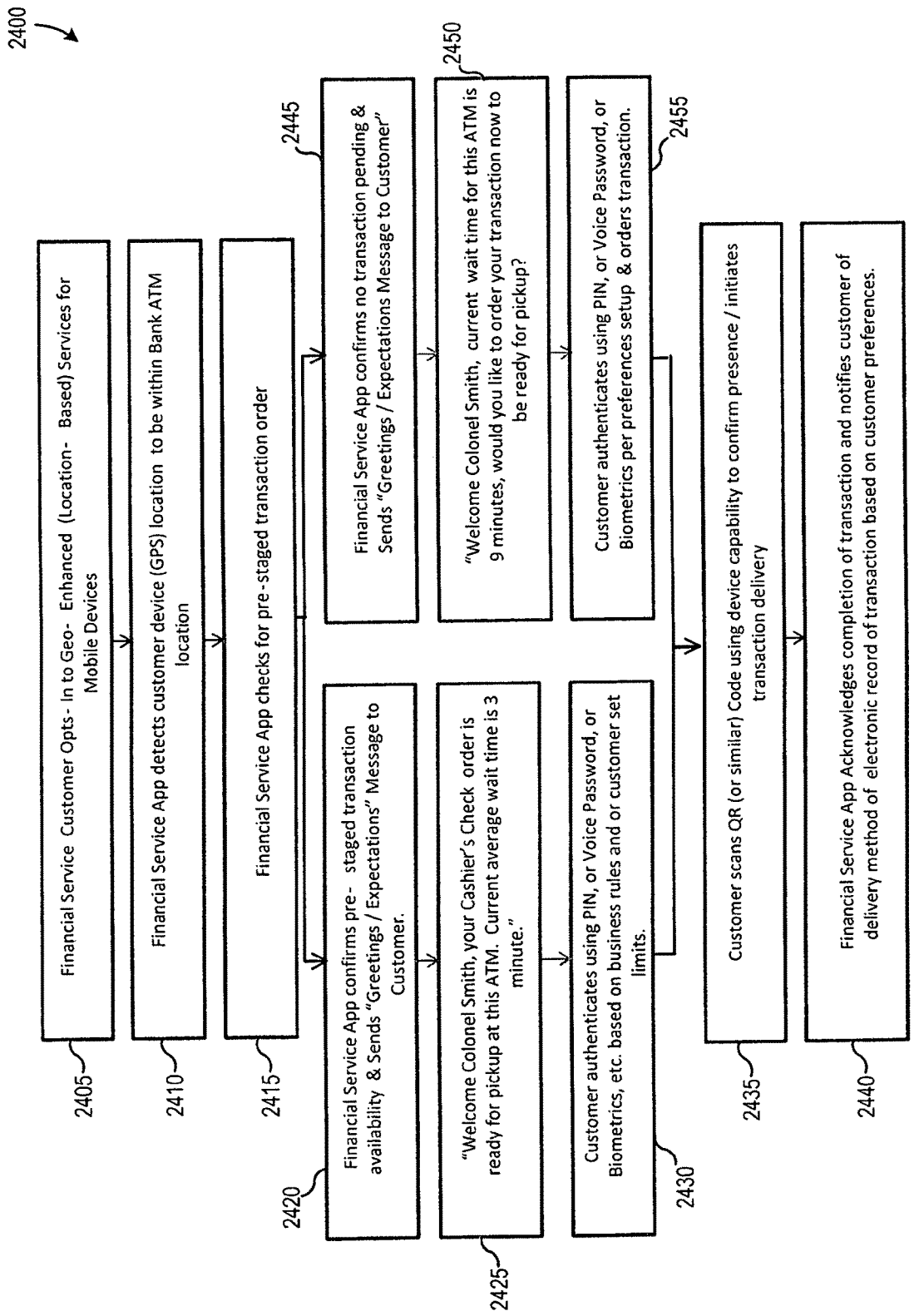
FIG. 24 is a flow chart illustrating a set of example operations for transacting in advance in accordance with some embodiments of the present invention.

FIG. 24 is a flow chart illustrating a set of example operations 2400 for transacting in advance in accordance with some embodiments of the present invention. Moreover, the operations may occur in different orders than described. One or more of the operations can be performed by various components in FIG. 2 such as memory 210, one or more processors 220, device registration module 230; processing module 240, location determination module 250, point of transaction module 260, information module 270, mapping module 275, unique identifier module 280, point of transaction detection module 285, image receiving module 290, and GUI generation module 295.

In opting-in operation 2405, a financial service customer opts-in to location-based services for mobile devices, allowing a financial services organization (or the customer) to determine when the customer is within a threshold distance of an ATM. In detecting operation 2410, the financial service application detects that the device's/customer's location is within a certain distance of an ATM in which the customer can transact with the financial institution. In checking operation 2415, the financial service application checks the customer's account for any pre-staged transaction orders.

When the customer has pre-staged a transaction, the financial service application confirms the availability of the pre-staged transaction and sends a welcome message to the customer in greeting operation 2420. Confirming the availability may include detecting whether the ATM has the capability to engage in the pre-staged transaction. For example, if the pre-staged transaction is to print a cashier's check but the ATM is out of paper, then the mobile application may advise the customer that the pre-staged transaction cannot be completed at this ATM. The mobile application may suggest other nearby ATMs. Assuming the ATM is available for the transaction, in messaging operation 2425, a message is sent to the customer's mobile device confirming that the pre-staged transaction has been completed and providing instructions and/or information to the customer (e.g, "your Cashier's check order is ready for pickup at this ATM. Current average wait time is 3 minutes"). In authentication operation 2430, the customer authenticates by providing a PIN, voice password, biometrics, or other authenticating information based on business rules and/or customer set authentication limits. In some embodiments, the authentication level required is based on the type of transaction.

In initiating operation 2435, the customer scans a QR code (or other similar code) using the device to confirm presence or initiate the transaction delivery at the ATM. Upon receipt of the QR code, in acknowledging operation 2440, the financial service application acknowledges completion of the transaction and notifies the customer of the delivery method of the electronic record of transaction based on the customer preferences. For example, if the customer has identified a preference for email receipts/confirmations, the receipt/confirmation will be delivered to an email address associated with the customer.

When it is detected that the customer has not pre-staged a transaction, the financial service application confirms that the customer does not have any transactions pending and sends a welcome message to the customer in greeting operation 2445. In messaging operation 2450, the customer may be informed of an approximate wait time to use the ATM and asked if the customer would like to begin the transaction while waiting in line. In some embodiments, the question regarding beginning the transaction while waiting in line may appear only if the wait time is over a threshold wait time. The customer authenticates by providing a PIN, voice password, biometrics, or other authenticating information based on business rules and/or customer set authentication limits in authentication operation 2455. The transaction is completed and a confirmation or receipt is delivered as described above in initiating operation 2435 and acknowledging operation 2440.

In some embodiments, the mobile application is interactive with the financial institution's banking system, including ATM functionality. This may provide real-time feedback to alert the customer when something at the ATM is not functioning properly and is suddenly unable to fulfill the ordered transaction as expected. The proactive alerting may also offer a solution by locating the most convenient alternative based on the customers current location. For example, if an ATM runs out of cash deposit capacity (or malfunctioned for any reason), a nearby service center or another ATM may still be an acceptable solution for the customer and could be presented on the application's mapping function with an option for the customer to place the customer in a queue at the selected ATM or banking location. This way, the customer would be notified pro-actively and would avoid waiting in line to discover the problem at the ATM.

Figure 25:
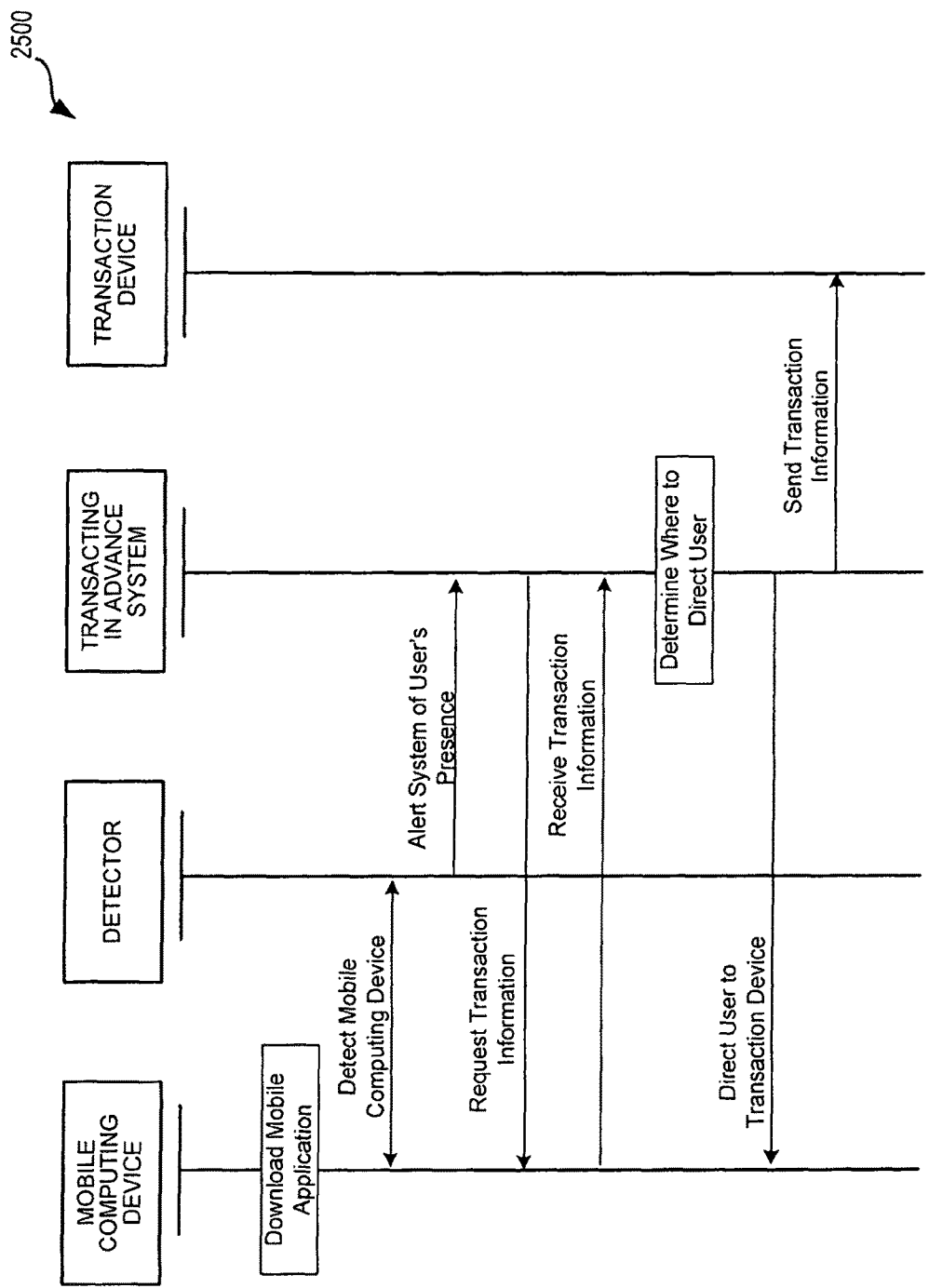
FIG. 25 is a sequence diagram illustrating a set of operations.

FIG. 25 is a sequence diagram illustrating a set of operations in accordance with various embodiments of the present disclosure. As illustrated in FIG. 25, a user may download a mobile application for a mobile computing device. The mobile application may allow the user to communicate with a financial institution to pre-stage financial transactions, check account statuses, remotely deposit checks, submit insurance documents, apply for loans, and participate in other activities with a financial institution. In connection with the mobile application, when the user is within a certain proximity of a banking location, a detector may detect the mobile computing device using GPS, network proximity techniques, geofencing, or other location techniques. In some embodiments, the mobile application may allow the user to "opt-in" or "opt-out" of allowing the financial institution to detect the user's location using these techniques. When the detector detects the mobile computing device, the detector alerts the transacting in advance system of the user's presence at or near the banking location.

Once the transacting in advance system is aware of the user's presence, the transacting in advance system may request transaction information from the user computing device or the user. For example, the user may be asked what type of transaction the user will be conducting. Using the mobile application or other correspondence feature on the mobile computing device, the user may provide transaction information to the transaction in advance system. In some embodiments, the user may be asked if the user would like to pre-stage the transaction while the user is waiting in line. In some embodiments, the transacting in advance system may access previously stored information regarding a transaction the user has pre-staged.

When the transacting in advance system has at least some information relating to a transaction (e.g., a name of the user, a type of the transaction, etc.), the user may be put into a queue and/or directed to a line or area of the banking location via the mobile application. For example, the user may be directed to a teller who specializes in a particular type of transaction. The user may be directed to a kiosk or ATM. The area or line the user is directed to may depend on a type of the transaction, the length of the line, the estimated wait time in each line (e.g., information regarding other user's transactions could be surveyed and calculated to report an estimated wait time or length of line could be detected to estimate wait time), a name of the customer (e.g., did the customer schedule in advance), etc.

The transaction information provided by the user and any pre-staged transaction information may be communicated to the transaction device associated with the area in which the user was directed to. For example, if the user was directed to a particular teller line, then the user's transaction information may be transferred to the teller's computing device. In some embodiments, the teller's screen may be automatically populated when the user approaches the teller. In some embodiments, the teller's screen may be automatically populated with the transaction information when the user provides authentication information and/or a code to the teller and/or the computing device. In some embodiments, the detection may occur at a further distance from the banking location, such as a few blocks or a few miles. The user's location may be detected and the user may receive a reminder about a pre-staged transaction with a map to the nearby banking location.

In some embodiments, the user may be asked to login to the mobile application or to provide other authentication information. In some embodiments, the user computing device is detected using NFC, RFID or other short-range technology. For example, when the user arrives at a banking location, the user may alert the transacting in advance system of his or her presence by scanning a code (e.g., quick response code) into the user's mobile computing device. This code may be located at the entrance to the banking location, such as where one may find deposit slips. In other embodiments, the user may present a code (e.g., quick response code) to the banking location. The code presented by the user may contain pre-staged transaction details, provide identification of the user, and/or provide a unique transaction number identifying the pre-staged transaction. This code may have been received by the user when the user pre-staged the transaction and/or generated by the mobile application. The user may present this code at the banking location prior to reaching a representative computing device, kiosk, ATM or other transaction device, or the user may present this code upon reaching the representative computing device, kiosk, ATM or other transaction device.

Computer System Overview

Figure 26:
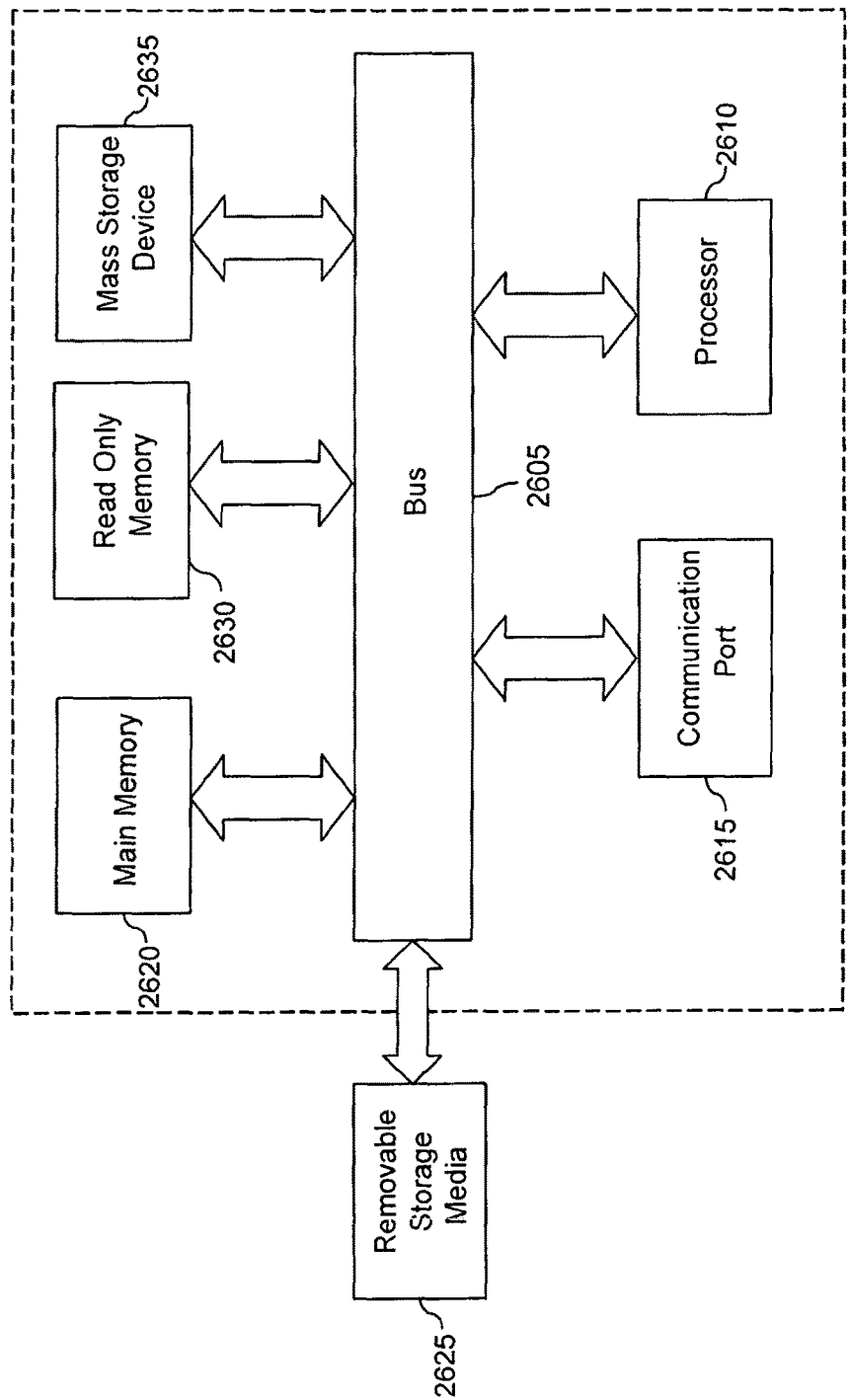
FIG. 26 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 26 is an example of a computer system 2600 with which embodiments of the present invention may be utilized. According to the present example, the computer system includes a bus 2605, at least one processor 2610, at least one communication port 2615, a main memory 2620, a removable storage media 2625, a read only memory 2630, and a mass storage device 2635.

Processor(s) 2610 can be any known processor, such as, but not limited to, an Intel® Itanium® or Itanium 2® processor(s), or AMD® Opteron® or Athlon MP® processor(s), or Motorola® lines of processors. Communication port(s) 2615 can be any of an RS-232 port for use with a modem based dialup connection, a 10/100 Ethernet port, or a Gigabit port using copper or fiber. Communication port(s) 2615 may be chosen depending on a network such a Local Area Network (LAN), Wide Area Network (WAN), or any network to which the computer system 2600 connects.

Main memory 2620 can be Random Access Memory (RAM), or any other dynamic storage device(s) commonly known in the art. Read only memory 2630 can be any static storage device(s) such as Programmable Read Only Memory (PROM) chips for storing static information such as instructions for processor 2610.

Mass storage 2635 can be used to store information and instructions. For example, hard disks such as the Adaptec® family of SCSI drives, an optical disc, an array of disks such as RAID, such as the Adaptec family of RAID drives, or any other mass storage devices may be used.

Bus 2605 communicatively couples processor(s) 2610 with the other memory, storage and communication blocks. Bus 2605 can be a PCI/PCI-X or SCSI based system bus depending on the storage devices used.

Removable storage media 2625 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to staging transactions, embodiments of the present invention are equally applicable to other types of transactions. For example, various embodiments of the present invention contemplate scheduling orders and/or prepaying while at a drive through restaurant, pharmacy, etc.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, embodiments of the present invention provides novel systems, methods and arrangements for systems and methods to stage transactions. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations that fall within the scope of the claims, together with all equivalents thereof. Therefore, the above description should not be taken as limiting the scope of the invention, which is defined by the appended claims.

What is claimed is:

1. A method comprising:
   detecting, by a computing system, a computing device associated with a user within a proximity of a banking location;
   scanning, by a scanner associated with the computing system, a unique identifier from the computing device, wherein the unique identifier identifies a transaction;
   decoding the unique identifier to identify the transaction;
   determining a type of the transaction based on the transaction identified in the unique identifier; and
   sending a message to the computing device that directs the user to an area within the banking location based at least in part on the type of the transaction.

2. The method of claim 1, the method further comprising:
   in response to decoding the unique identifier, placing the transaction into a queue.

3. The method of claim 2, the method further comprising:
   in response to detecting the computing device, requesting the user to provide authentication information;
   receiving the authentication information; and
   authenticating the user, wherein placing the transaction into the queue occurs upon authentication.

4. The method of claim 1, wherein the unique identifier further identifies user preferences.

5. The method of claim 1, wherein the area of the banking location includes one or more of a kiosk, a window teller, or an automated teller machine.

6. The method of claim 1, the method further comprising determining an identity of the user based on one or more of the unique identifier or the computing device.

7. The method of claim 1, wherein the unique identifier is a quick response code, wherein the quick response code further identifies the user, a device that pre-staged the transaction, and user preferences.

8. The method of claim 1, wherein the computing device is detected using geofencing or network proximity techniques.

9. The method of claim 1, the method further comprising:
   surveying the banking location using video cameras or weight sensors; and
   determining estimated wait times for each of the areas of the banking location.

10. A non-transitory computer-readable storage medium comprising a set of instructions that, when executed by one or more processors, cause the one or more processors to perform operations comprising:
    detecting, by a computing system, a computing device associated with a user within a proximity of a banking location;
    scanning, by a scanner associated with the computing system, a unique identifier from the computing device, wherein the unique identifier identifies a transaction;
    decoding the unique identifier to identify the transaction;
    determining a type of the transaction based on the transaction identified in the unique identifier; and
    sending a message to the computing device that directs the user to an area within the banking location based at least in part on the type of the transaction.

11. The non-transitory computer-readable storage medium of claim 10, wherein the operations further comprise: in response to decoding the unique identifier, placing the transaction into a queue.

12. The non-transitory computer-readable storage medium of claim 11, wherein the operations further comprise:
    in response to detecting the computing device, requesting the user to provide authentication information;
    receiving the authentication information; and
    authenticating the user, wherein placing the transaction into the queue occurs upon authentication.

13. The non-transitory computer-readable storage medium of claim 10, wherein the area of the banking location includes one or more of a kiosk, a window teller, or an automated teller machine.

14. The non-transitory computer-readable storage medium of claim 10, wherein the operations further comprise: determining an identity of the user based on one or more of the unique identifier or the computing device.

15. The non-transitory computer-readable storage medium of claim 10, wherein the unique identifier is a quick response code, wherein the quick response code further identifies the user, a device that pre-staged the transaction, and user preferences.

16. The non-transitory computer-readable storage medium of claim 10, wherein the computing device is detected using geofencing or network proximity techniques.

17. The non-transitory computer-readable storage medium of claim 10, wherein the operations further comprise:
    surveying the banking location using video cameras or weight sensors; and
    determining estimated wait times for each of the areas of the banking location.

18. A system comprising:
    a detector operable to detect a computing device associated with a user within a proximity of a banking location, wherein the detector comprises a scanner operable to scan a unique identifier from the computing device, and wherein the unique identifier identifies a transaction; and
    a server communicably coupled to the detector, wherein the server is operable to:
       decode the unique identifier to identify the transaction,
       determine a type of the transaction based on the transaction identified in the unique identifier, and
       send a message to the computing device that directs the user to an area within the banking location based at least in part on the type of the transaction.

19. The system of claim 18, wherein the transaction is a pre-staged transaction, wherein the unique identifier is a quick response code.

20. The system of claim 18, further comprising:
    a device associated with a representative operable to receive and display information from the transaction.

\* \* \* \* \*